United States Patent
Buijsman

(10) Patent No.: US 11,280,402 B2
(45) Date of Patent: Mar. 22, 2022

(54) CONTINUOUSLY VARIABLE TRANSMISSION AND TRANSMISSION SYSTEM

(71) Applicant: HCVTRANSMISSION B.V., Noordwijkerhout (NL)

(72) Inventor: Petrus Johannes Buijsman, Hillegom (NL)

(73) Assignee: HCVTRANSMISSION B.V., Noordwijkerhout (NL)

( * ) Notice: Subject to any disclaimer, the term of this patent is extended or adjusted under 35 U.S.C. 154(b) by 260 days.

(21) Appl. No.: 16/492,699

(22) PCT Filed: Mar. 2, 2018

(86) PCT No.: PCT/NL2018/050132
§ 371 (c)(1),
(2) Date: Sep. 10, 2019

(87) PCT Pub. No.: WO2018/164596
PCT Pub. Date: Sep. 13, 2018

(65) Prior Publication Data
US 2020/0049250 A1    Feb. 13, 2020

(30) Foreign Application Priority Data
Mar. 10, 2017    (NL) ........................... 2018498

(51) Int. Cl.
*F16H 61/00*    (2006.01)
*F04C 2/10*    (2006.01)
(Continued)

(52) U.S. Cl.
CPC ......... *F16H 61/0025* (2013.01); *F04C 2/101* (2013.01); *F04C 2/102* (2013.01);
(Continued)

(58) Field of Classification Search
CPC ...... F04C 11/001; F04C 14/185; F04C 2/101; F04C 2/102; F04C 2/18; F16H 39/00; F16H 61/0025; F16H 61/50
See application file for complete search history.

(56) References Cited

U.S. PATENT DOCUMENTS 6,588,207 B1 * 7/2003 Pouliot ................... F16H 39/36
418/201.3
6,623,387 B1    9/2003 Luh et al.
(Continued)

FOREIGN PATENT DOCUMENTS

EP    2610492 A1    7/2013
FR    1230990 A     9/1960
(Continued)

OTHER PUBLICATIONS

International Search Report and Written Opinion from PCT/NL2018/050132, dated May 16, 2018.
Netherlands Search Report from NL 2018498, dated Dec. 1, 2017.

*Primary Examiner* — Mary Davis
(74) *Attorney, Agent, or Firm* — Workman Nydegger

(57) ABSTRACT

The invention relates to a continuously variable transmission and a transmission system comprising said continuously variable transmission, wherein the continuously variable transmission comprises a first gear pump and a second gear pump, wherein each gear pump comprises a first gear and a second gear meshing with the first gear over an overlap distance in an overlap direction parallel to the first gear axis, wherein each gear pump further comprises an adjustment member for adjusting the pump volume, wherein the adjustment member of the first gear pump and the adjustment member of the second gear pump are interconnected by a connecting member for adjusting the pump volume of the
(Continued)

first gear pump and the pump volume of the second gear pump in an inverse correlation to each other.

20 Claims, 30 Drawing Sheets

(51) Int. Cl.
    *F04C 2/18*           (2006.01)
    *F04C 14/18*         (2006.01)
    *F16H 39/00*         (2006.01)
    *F16H 61/50*         (2006.01)
    *F04C 11/00*         (2006.01)

(52) U.S. Cl.
    CPC .............. *F04C 2/18* (2013.01); *F04C 11/001* (2013.01); *F04C 14/185* (2013.01); *F16H 39/00* (2013.01); *F16H 61/50* (2013.01)

(56) References Cited

U.S. PATENT DOCUMENTS

| | | | | |
|---|---|---|---|---|
| 2001/0024618 A1* | 9/2001 | Winmill | ................ | F04C 14/185 |
| | | | | 418/1 |
| 2015/0167667 A1* | 6/2015 | Miyajima | ................ | F04C 2/18 |
| | | | | 418/21 |
| 2018/0223839 A1* | 8/2018 | Jang | ........................ | F04C 2/101 |

FOREIGN PATENT DOCUMENTS

| | | | |
|---|---|---|---|
| WO | 0037825 A2 | 6/2000 | |
| WO | 2014086968 A1 | 6/2014 | |

* cited by examiner

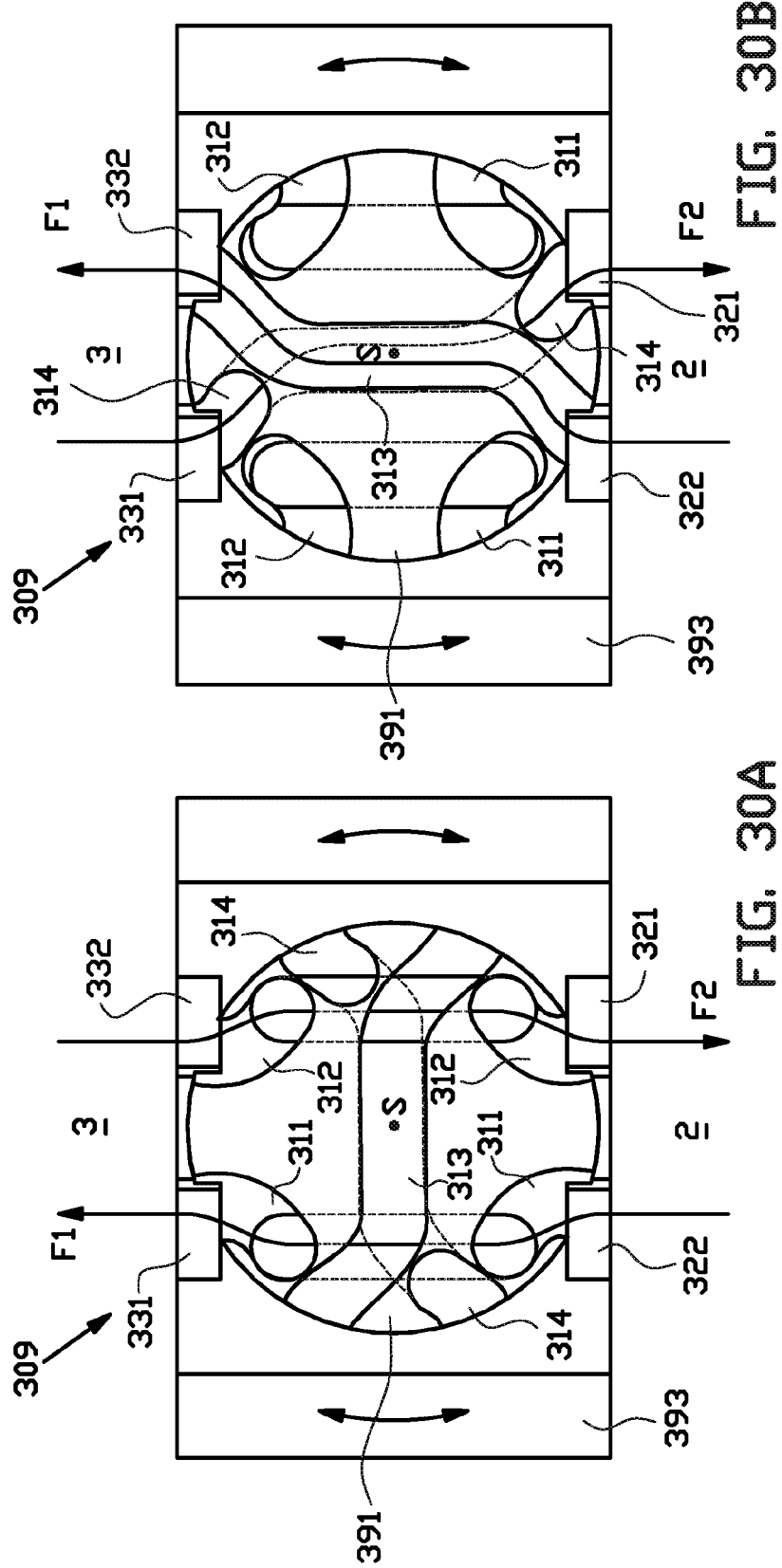

CONTINUOUSLY VARIABLE TRANSMISSION AND TRANSMISSION SYSTEM

BACKGROUND

The invention relates to a continuously variable transmission, in particular for a vehicle, and a transmission system comprising said continuously variable transmission.

Push belts have been widely applied because of their ability to provide a simple yet effective continuously variable transmission. However, push belts are prone to slipping, especially in heavy load applications, e.g. in trucks. Hence, push belt transmissions are only used in relatively light applications.

FR 1.230.990 A discloses a hydraulic variator gear that is operable as a motor. The hydraulic variator gear comprises two rotors which are in mesh with each other between two planes which limit the portion of active teeth. One of the planes is formed at the end of a sleeve which has complimentary inner teeth from those of the rotor, in which the rotor is slidable to increase or decrease the length of the teeth that mesh. A spring is provided to allow for automatic operation of the hydraulic variator gear.

FR 1.230.990 A further discloses the use of two of the variators in an automatic transmission between an engine and a set of wheels of a vehicle. The engine comprises a drive shaft that includes a set of planetary gears. The annulus of said planetary gears is engaged by a first variator that operates as a hydraulic motor. The first variator is hydraulically connected to and drives a second variator that functions as a hydraulic pump. The second variator is mechanically coupled to the drive shaft of the engine to deliver more torque if the resistive torque on the wheels decreases and to deliver more speed if the resistive torque on the wheels increases. The known automatic transmission provides a continuous range of speed and torque which are automatically adapted to difficulties encountered. The second variator can be manually operated to introduce speed ratios or additional torque for exceptional roads, e.g. steep slopes or all terrain.

In said known automatic transmission, only a portion of the power of the engine travels through the variators and is affected by their performance. Moreover, the transmission ratio between the rotational speed of the engine and the rotational speed of the wheels is limited to the gear ratios as defined by the planetary gears. Hence, although the speed and torque may be continuously adjusted, the choice of transmission ratios is limited.

It is an object of the present invention to provide an alternative continuously variable transmission and a transmission system comprising said continuously variable transmission.

SUMMARY OF THE INVENTION

According to a first aspect, the invention provides a continuously variable transmission comprising a first gear pump and a second gear pump, wherein each gear pump comprises a fluid inlet, a fluid outlet and a pump volume between the fluid inlet and the fluid outlet, wherein each gear pump further comprises a first gear rotatable within the respective pump volume about a first gear axis and a second gear rotatable within the respective pump volume about a second gear axis and meshing with the first gear over an overlap distance in an overlap direction parallel to the first gear axis for displacing fluid through the respective pump volume from the respective fluid inlet to the respective fluid outlet, wherein the fluid outlet of the first gear pump is arranged in fluid communication with the fluid inlet of the second gear pump and the fluid outlet of the second gear pump is arranged in fluid communication with the fluid inlet of the first gear pump, wherein each gear pump further comprises an adjustment member for adjusting the pump volume of the respective gear pump, wherein the adjustment member of the first gear pump and the adjustment member of the second gear pump are interconnected by a connecting member that is arranged for adjusting the pump volume of the first gear pump and the pump volume of the second gear pump in an inverse correlation to each other.

By adjusting the pump volumes in an inverse correlation to each other, with the pump volumes being in fluid communication with each other, the transmission ratio between the rotational speed of the first gear pump and the rotational speed of the second gear pump can be effectively adjusted. By using a fluid as the medium to transmit power in a substantially closed hydraulic circuit, slipping can be reduced, prevented or even eliminated. The transmission according to the present invention can thus be used in a particularly effective and/or efficient manner in both light and heavy load applications, e.g. in vehicles such as trucks. The transmission according to the present invention can further be used to optimize a power source, e.g. a combustion engine or an electrical engine, to run at its optimal rotational speed.

In a preferred embodiment the inverse correlation is an inverse proportionality. More preferably, the inverse proportionality is such that the ratio between an increase of one of the first pump volume and the second pump volume and a decrease of the other of the first pump volume and the second pump volume is 1:1. By choosing an inverse proportionality, the behavior of the transmission can be accurately predicted. By designing the transmission with a ratio of 1:1, the gear pumps can be used in a closed hydraulic system in which the decrease of one pump volume is absorbed by the other pump volume.

In a further embodiment the connecting member directly interconnects the adjustment member of the first gear pump and the adjustment member of the second gear pump. Hence, a reliable coupling between the movements of the respective adjustment members can be obtained.

In a further embodiment the connecting member mechanically interconnects the adjustment member of the first gear pump and the adjustment member of the second gear pump. The mechanical interconnecting can for example be a direct coupling of both adjustment members.

In a further embodiment the adjustment member of the first gear pump, the adjustment member of the second gear pump and the connecting member are integrally formed. By integrating the said parts, the complexity of the transmission can be greatly reduced and/or the transmission can be more compact.

In an alternative embodiment the connecting member is arranged for hydraulically interconnecting the adjustment member of the first gear pump and the adjustment member of the second gear pump with the use of a hydraulic circuit separate from the pump volume of the first gear pump and the pump volume of the second gear pump. Hence, said circuit can be used to control the transmission in a non-mechanical manner.

In a further embodiment each adjustment member is arranged for providing a relative movement between the first gear and the second gear of the respective gear pump in the respective overlap direction. Hence, the overlap between said set of meshing gears can be effectively adjusted.

In a further embodiment each adjustment member is arranged for holding one of the first gear and the second gear of the respective gear pump and is movable in the respective overlap direction in unison with said one gear. Hence, said one gear can be moved by simply moving the adjustment member associated therewith.

In a further embodiment each gear pump further comprises a holding member opposite to the adjustment member of the respective gear pump in the respective overlap direction for holding one of the first gear and the second gear of the respective gear pump, wherein the holding member and the adjustment member comprise a first sealing surface and a second sealing surface, respectively, for sealing the pump volume of the respective gear pump in the respective overlap direction between the holding member and the adjustment member of the respective gear pump, wherein the second sealing surface is movable in the respective overlap direction towards and away from the first sealing surface. By moving the sealing surfaces with respect to each other, the pump volume of the respective gear pump can be effectively increased and/or decreased.

In a further embodiment thereof each first sealing surface is provided with a first surface section and a second surface section for sealing the pump volume of the respective gear pump at the first gear and the second gear, respectively, wherein the second surface section is rotatable with respect to the first surface section about the second gear axis together with the second gear and is provided with an opening with a contour that is a negative of the contour of the second gear for at least partially receiving the second gear through the first sealing surface in the respective overlap direction. Hence, at least a part of the second gear can be sealed off from the pump volume, thereby reducing the meshing overlap distance of said gear within the pump volume.

In a further embodiment thereof the holding member comprises a base for holding the first gear and a receptacle for at least partially receiving the second gear in the respective overlap direction. The receptacle can be used to contain the part of the second gear that is sealed off from the pump volume.

In a further embodiment thereof the receptacle of the holding member is rotatable with respect to the base of the holding member about the second gear axis, wherein the receptacle of the holding member, in cross section, has a receiving space that has the same shape as the opening in the second surface section. Hence, the second gear can be received through the opening into the receiving space behind said opening.

In a further embodiment thereof the second surface section is formed by the receptacle of the holding member. Hence, the function of receiving the second gear and sealing the pump volume at the second gear can be achieved by the same part.

In an embodiment each second sealing surface is provided with a third surface section and a fourth surface section for sealing the pump volume of the respective gear pump at the first gear and the second gear, respectively, wherein the third surface section is rotatable with respect to the fourth surface section about the first gear axis together with the first gear and is provided with an opening with a contour that is a negative of the contour of the first gear for at least partially receiving the first gear through the second sealing surface in the respective overlap direction. Hence, like the second gear, at least a part of the first gear can be sealed off from the pump volume, thereby reducing the meshing overlap distance of said gear within the pump volume.

In an embodiment thereof the adjustment member comprises a base for holding the second gear and a receptacle for at least partially receiving the first gear in the respective overlap direction.

In a further embodiment thereof the receptacle of the adjustment member is rotatable with respect to the base of the adjustment member about the first gear axis, wherein the receptacle of the adjustment member, in cross section, has a receiving space that has the same shape as the opening in the third surface section.

In a further embodiment thereof the third surface section is formed by the receptacle of the adjustment member. The receptacle can be used to contain the part of the first gear that is sealed off from the pump volume.

In another preferred embodiment each gear comprises a first gear part with a plurality of first gear teeth distributed circumferentially about the respective gear axis and a second gear part with a plurality of second gear teeth distributed circumferentially about the same gear axis, wherein the first gear teeth and the second gear teeth are slidable along each other in the respective overlap direction for telescopically extending or contracting the respective gear in the respective overlap direction. By providing telescopically extending and contracting gears, one does not require the aforementioned receptacles. The telescopic gears can simple by extended or contracted to adjust the meshing overlap distance.

In an embodiment thereof the first gear teeth and the second gear teeth are half gear teeth, wherein each pair of one of the first gear teeth and one of the second gear teeth forms a complete gear tooth of the respective gear. Both sets of half gear teeth can effectively displace fluid through the gear pump. Hence, whether the telescopic gears are fully extended or fully contracted does not affect the ability of said telescopic gears to displace the fluid.

In an embodiment the first gear and the second gear are external gears. Consequently, the first gear pump and the second gear pump can be regarded as external gear pumps.

In an alternative embodiment one of the first gear and the second gear is an internal gear and the other of the first gear and the second gear is an external gear with less teeth than and meshing with the internal gear. By using a set of a meshing internal and external gear, the gear pump can be more compact.

In an embodiment thereof each gear pump comprises a stationary crescent between the external gear and the internal gear. Said stationary crescent can guide the rotations of the respective meshing gears about their respective gear axes.

In a further embodiment thereof the first gear pump and the second gear pump are internal gear pumps. An internal gear pump may provide an effective alternative to an external gear pump.

In an alternative embodiment the first gear pump and the second gear pump are gerotor gear pumps. A gerotor gear pump may provide an effective alternative to an external gear pump or a 'normal' internal gear pump. In particular, unlike the aforementioned internal gear pump, the gerotor gear pump does not require a stationary crescent.

In another embodiment the continuously variable transmission further comprises a control member for controlling the adjustment members of the respective gear pump. Preferably, the control member is a lever, preferably a gear lever or a gear stick, that is operationally coupled to the adjustment member of the first gear pump, the adjustment member of the second gear pump or the connecting member. The control member allows for user controlled adjustment, e.g. by manual input, of the transmission ratio.

In a further embodiment thereof each gear pump comprises one or more chambers separated from the pump volume of the respective gear pump, wherein each chamber has a chamber volume that is arranged to absorb the expansion of the pump volume of the respective gear pump, wherein the control member comprises an hydraulic circuit interconnecting at least two of the chambers and a drive pump for pumping hydraulic fluid from one of said two chambers to the other of said two chambers. Hence, the movement of the adjustment members can be effectively controlled by pumping hydraulic fluid back and forth between the chambers.

In an embodiment thereof the control member comprises a switch element for switching between a first state in which the fluid outlet of the first gear pump is arranged in fluid communication with the fluid inlet of the second gear pump and the fluid outlet of the second gear pump is arranged in fluid communication with the fluid inlet of the first gear pump and a second state in which the fluid outlet of the first gear pump is arranged in fluid communication with the fluid outlet of the second gear pump and the fluid inlet of the second gear pump is arranged in fluid communication with the fluid inlet of the first gear pump.

In another embodiment the overlap direction of the first gear pump is parallel to the overlap direction of the second gear pump. By providing the overlap directions in parallel, the overall design of the transmission can be simplified significantly, e.g. by placing the gear pumps in-line.

In a further embodiment one of the first gear and the second gear of the first gear pump comprises or is connectable to an input axle. Hence, said one gear can be regarded as the drive gear, while the other gear is the idler gear. The drive gear can for example be driven by a vehicle engine.

In a further embodiment one of the first gear and the second gear of the second gear pump comprises or is connectable to an output axle. Hence, said one gear can be regarded as the drive gear, while the other gear is the idler gear. The drive gear can for example be used for driving the wheels of a vehicle.

In a further embodiment one of the first gear axis and the second gear axis of the first gear pump is coaxial with one of the first gear axis and the second gear axis of the second gear pump.

In an embodiment thereof each gear axis of the first gear pump is coaxial with one of the gear axes of the second gear pump. By aligning the gear axes, the design of the transmission can be simplified significantly.

In a further embodiment the first gear axis of the first gear pump is out of line with the first gear axis of the second gear pump and/or wherein the second gear axis of the first gear pump is out of line with the second gear axis of the second gear pump. Hence, parts of the transmission can be placed at least partially side-by-side or in an overlapping arrangement, thereby allowing the transmission to be more compact in a direction parallel to said axes.

In a further embodiment the continuously variable transmission further comprises a housing, wherein the first gear pump and the second gear pump are housed in the same housing. Hence, a compact transmission can be obtained.

In an embodiment thereof the housing at least partially defines the pump volume of the first gear pump and the pump volume of the second gear pump. Said housing can thus be used to both contain and seal both gear pumps, without requiring an additional housing for one of said purposes.

According to a second aspect, the invention provides a transmission system comprising the aforementioned continuously variable transmission, wherein the transmission system comprises a source of energy, preferably a source of mechanical energy, and one or more parts to be driven by said source of energy, wherein the continuously variable transmission is arranged between the source of energy and the one or more parts to be driven. Hence, the continuously variable transmission can be used to transmit the mechanical energy in a continuously variable transmission ratio to the one or more parts to be driven.

In an embodiment thereof the continuously variable transmission is arranged in-line or in series with the source of energy and the one or more parts to be driven. Hence, the continuously variable transmission can be used to directly transmit the mechanical energy in a continuously variable transmission ratio to the one or more parts to be driven.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 30A and 30B show a top view of a control member for controlling the continuously variable transmission according to FIG. 23.

DETAILED DESCRIPTION OF THE INVENTION

FIGS. 1-8 show a continuously variable transmission 1 according to a first exemplary embodiment of the invention. Said transmission 1 can be used as a continuously variable transmission in a transmission system for a vehicle, for an elevator, for a hoisting crane or for another transmission purpose.

Figure 1:
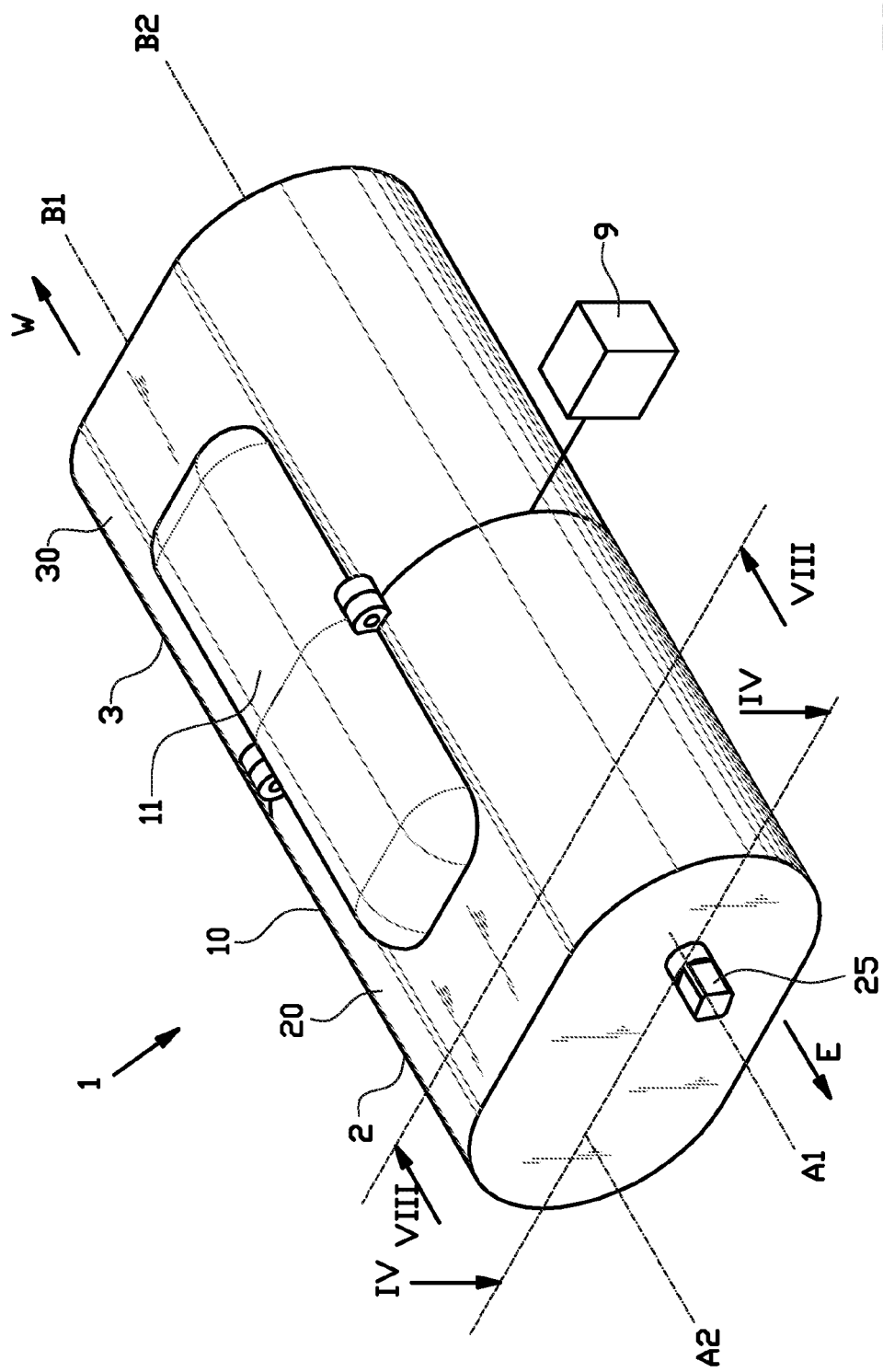
FIG. 1 shows an isometric view of a continuously variable transmission according to a first embodiment of the invention.
Figure 2:
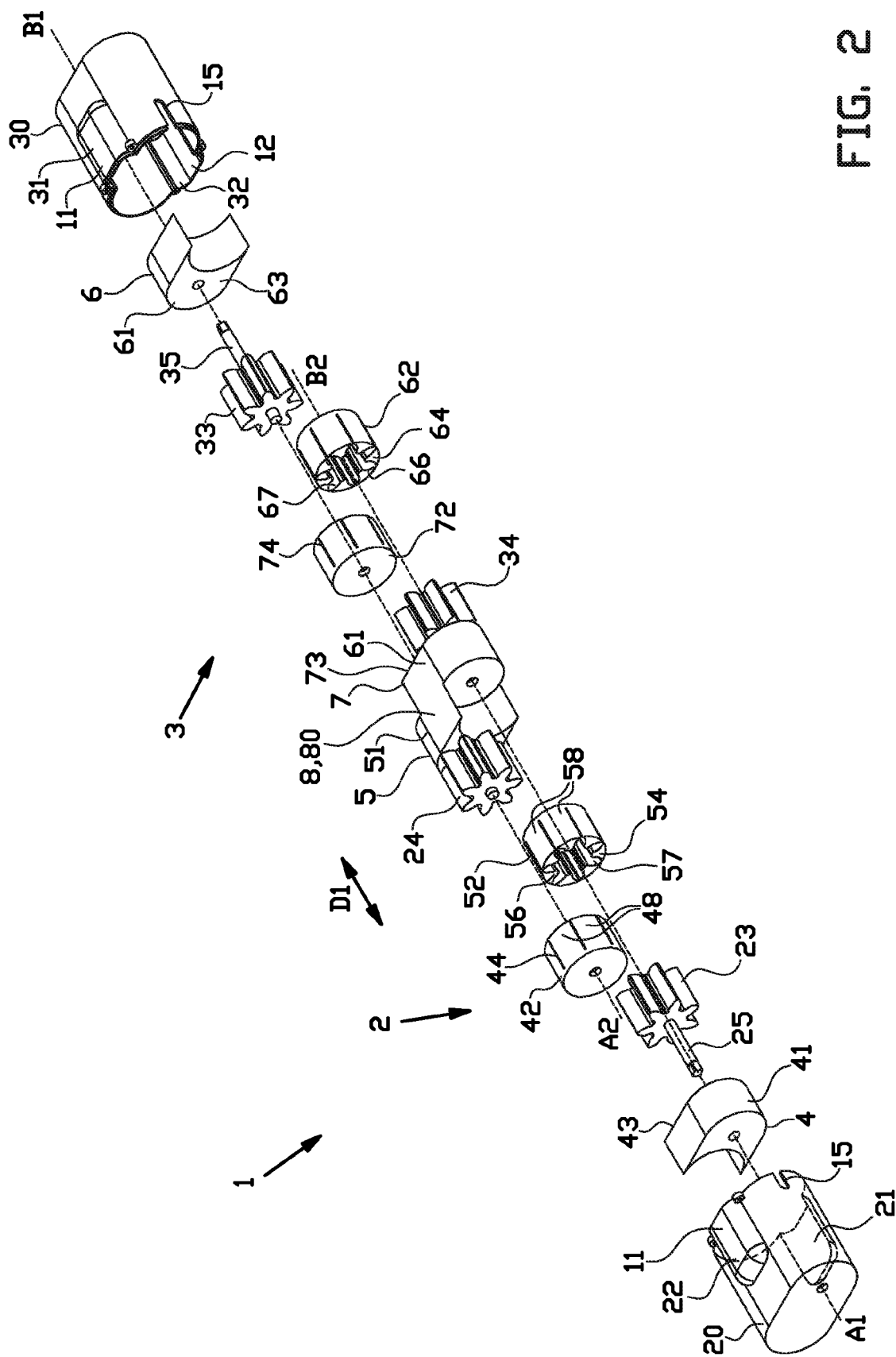
FIG. 2 shows an exploded view of the continuously variable transmission according to FIG. 1.

As shown in FIGS. 1-7, said continuously variable transmission 1 comprises a first gear pump 2 and a second gear pump 3 which, in this example, are external gear pumps 2, 3. As best seen in FIG. 2, the first gear pump 2 comprises a first housing part 20 with a fluid inlet 21 and a fluid outlet 22. As shown in FIG. 8, the first gear pump 2 comprises a pump volume V1 extending between the fluid inlet 21 and the fluid outlet 22. The first gear pump 2 further comprises a first gear 23 that is rotatable within the pump volume V1 of the first gear pump 2 about a first gear axis A1 and a second gear 24 that is rotatable within the pump volume V1 of the first gear pump 2 about a second gear axis A2. The first gear 23 and the second gear 24 are external gears. The second gear axis A2 is parallel to and spaced apart from the first gear axis A1 such that the teeth of the second gear 24 engage and/or mesh with the teeth of the first gear 23. As best seen in FIGS. 3-7, the first gear 23 and the second gear 24 are in meshing overlap with each other over an overlap distance X1 in an overlap direction D1 parallel to the first gear axis A1. Fluid is displaced through the pump volume V1 of the first gear pump 2 from the respective fluid inlet 21 to the respective fluid outlet 22 by the meshing teeth of the first gear 23 and the second gear 24.

As shown in FIGS. 2-7, the first gear pump 2 further comprises a holding member 4 and an adjustment member 5 that together with the first housing part 20 bound and/or define the pump volume V1 of the first gear pump 2. In particular, the holding member 4 and the adjustment member 5 define the pump volume V1 in a direction parallel to the overlap direction D1 while the first housing part 20 defines the pump volume V1 in a circumferential direction about the first gear axis A1 and/or the second gear axis A2. The adjustment member 5 is movable in the overlap direction D1 towards and away from the holding member 4 to adjust the pump volume V1 of the first gear pump 2.

As best seen in FIG. 2, the holding member 4 is provided with a base 41 for holding the first gear 23 and a receptacle 42 for at least partially receiving the second gear 24. The base 41 is stationary while the receptacle 42 is rotatable with respect to said base 51 about the second gear axis A2. As shown in FIGS. 3-7, the base 41 and the receptacle 42 form a first surface section 43 and a second surface section 44, respectively. Together, said surface sections 43, 44 form a first sealing surface 45 for sealing the pump volume V1 of the first gear pump 2 in the overlap direction D1 at the side of the holding member 4. The second surface section 44 is rotatable with respect to the first surface section 43 about the second gear axis A2 together with the second gear 24 and is provided with an opening 46 with a contour that is a negative of the contour of the second gear 24. Preferably, the tolerance between the opening 46 and the contour of the second gear 24 is so small that it does not allow fluid inside the pump volume V1 to escape through said opening 46. Most preferably, the second surface section 44 sealingly abuts the second gear 24. Hence, the second gear 24 can be at least partially received through said opening 46 in the overlap direction D1 while the second surface section 44 effectively seals the pump volume V1 at said second gear 24.

Figure 5:
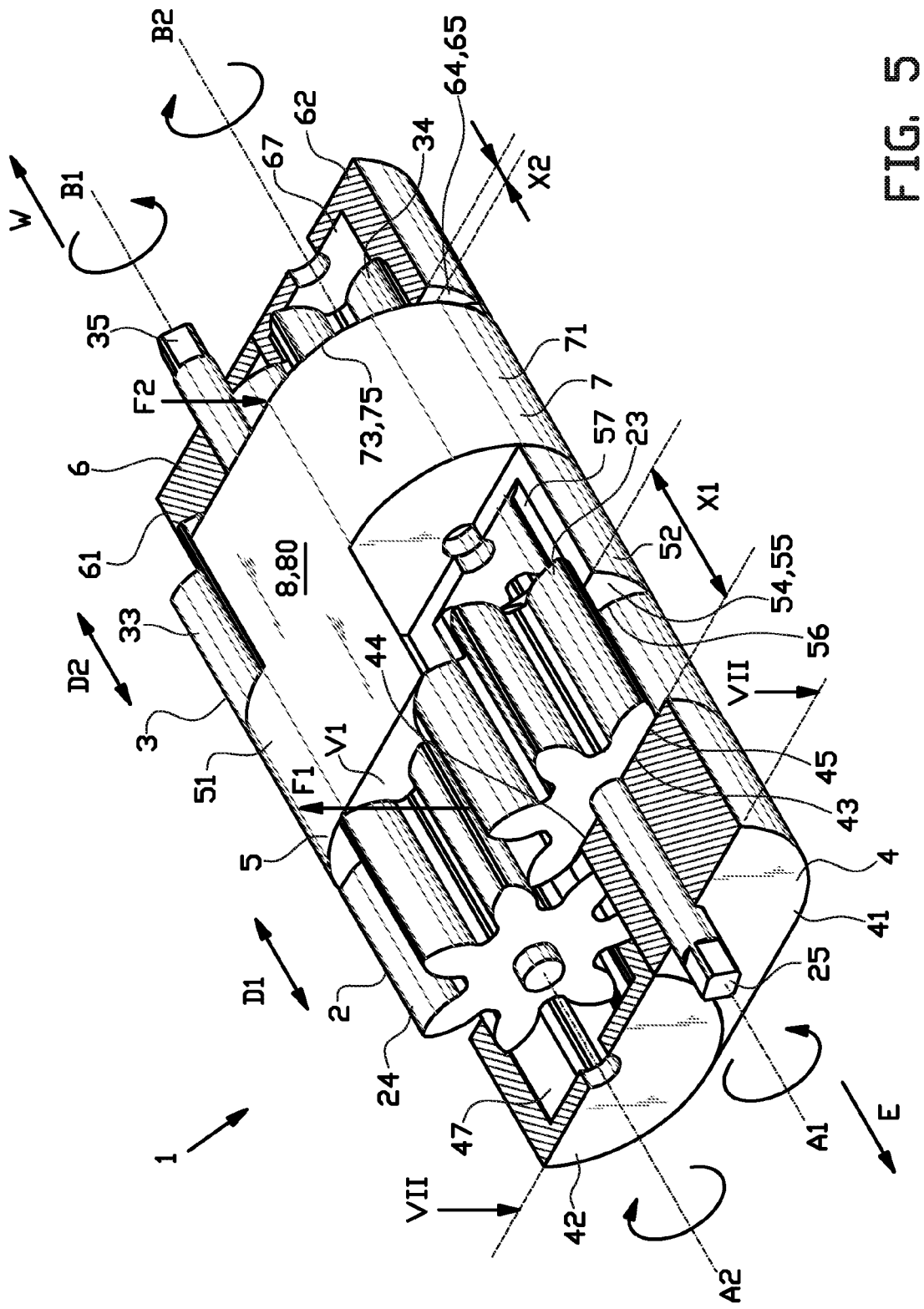
FIG. 5 shows the partial cross section of the transmission according to FIG. 4, with the continuously variable transmission in a second transmission position.
Figure 7:
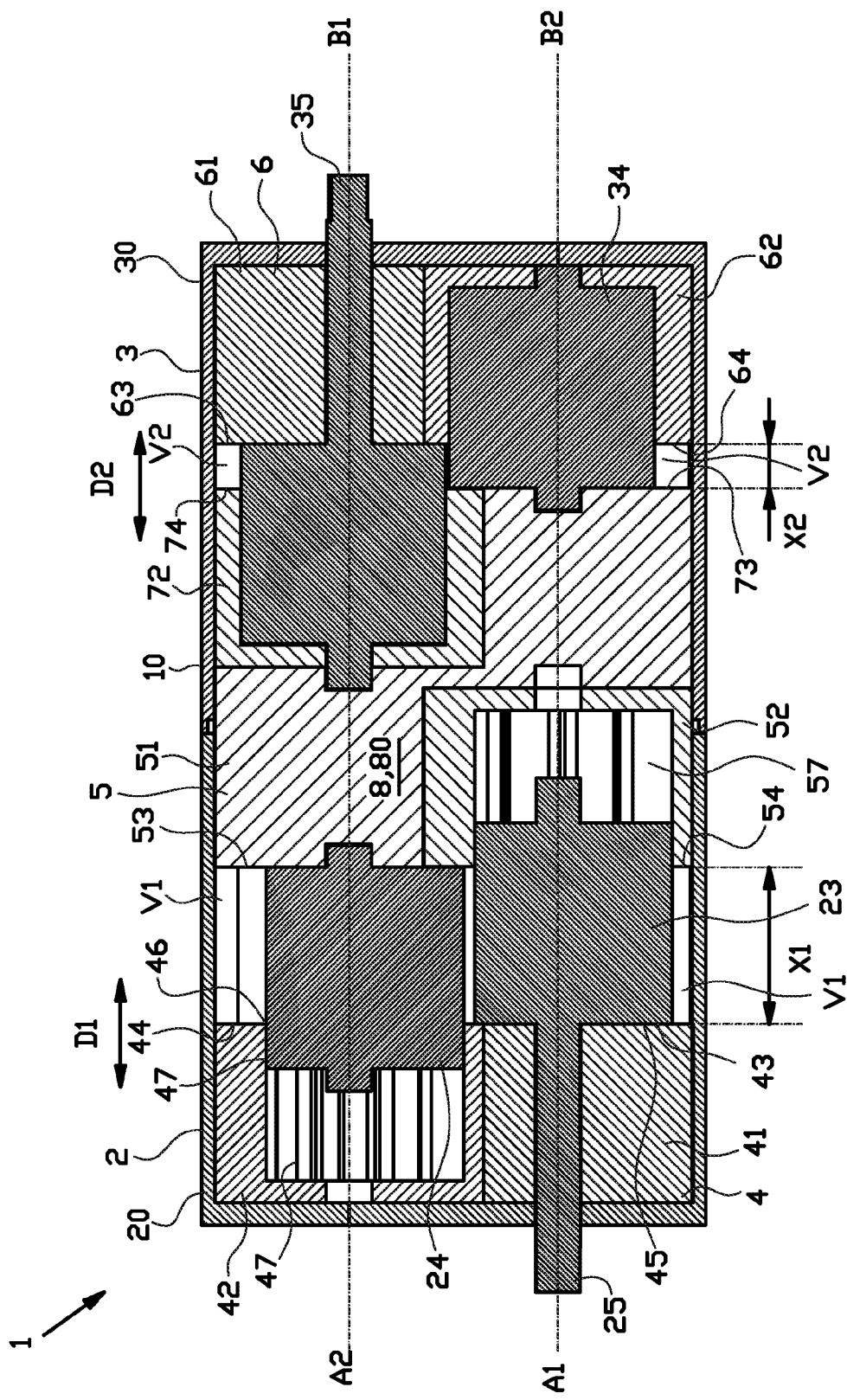
Figure 8:
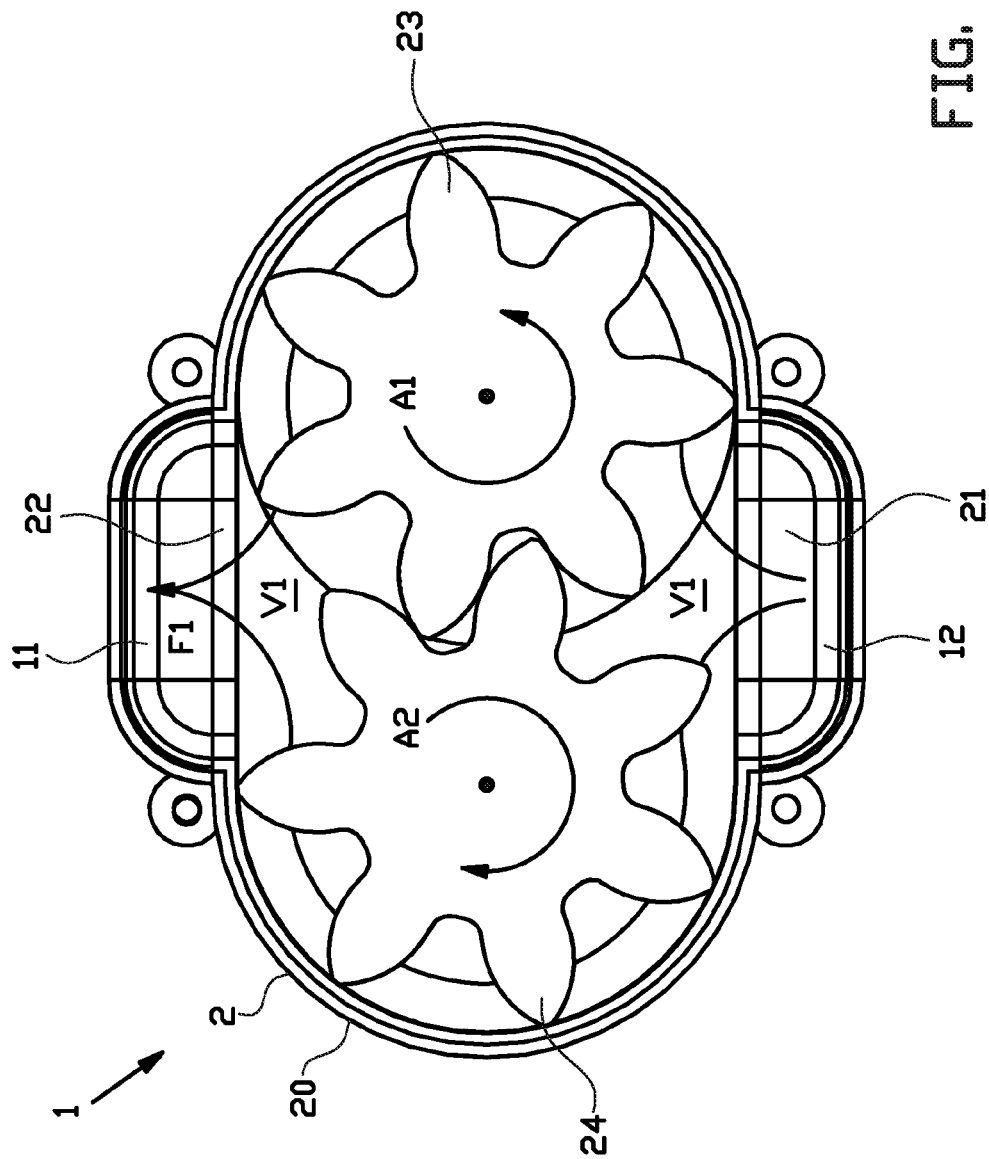
FIG. 8 shows a cross section of the continuously variable transmission according to line VIII-VIII in FIG. 1.

As best seen in FIGS. 5 and 7, the receptacle 42 of the holding member 4 has a receiving space 47 that has the same shape as the opening 46 in the second surface section 44. More in particular, as shown in FIG. 2, the receptacle 42 comprises a plurality of fingers 48 defining said receiving space 47 and extending in the overlap direction D1 between the teeth of the second gear 24 to seal the intermediate spaces between said teeth. The second surface section 44 is formed at the distal ends of said fingers 48.

As best seen in FIG. 2, the adjustment member 5 comprises a base 51 for holding the second gear 24 and a receptacle 52 for at least partially receiving the first gear 23. The base 51 is stationary while the receptacle 52 is rotatable with respect to said base 51 about the first gear axis A1. As shown in FIGS. 3-7, the base 51 and the receptacle 52 form a first surface section 53 and a second surface section 54, respectively. Together, said surface sections 53, 54 form a second sealing surface 55 for sealing the pump volume V1 of the first gear pump 2 in the overlap direction D1 at the side of the adjustment member 5. The second surface section 54 is rotatable with respect to the first surface section 53 about the first gear axis A1 together with the first gear 23 and is provided with an opening 56 with a contour that is a negative of the contour of the first gear 23. Preferably, the tolerance between the opening 56 and the contour of the first gear 23 is so small that it does not allow fluid inside the pump volume V1 to escape through said opening 56. Most preferably, the second surface section 54 sealingly abuts the first gear 23. Hence, the first gear 23 can be at least partially received through said opening 55 in the overlap direction D1 while the second surface section 54 effectively seals the pump volume V1 at said first gear 23.

As best seen in FIGS. 5 and 7, the receptacle 52 of the adjustment member 5 has a receiving space 57 that has the same shape as the opening 56 in the second surface section 54. More in particular, as shown in FIG. 2, the receptacle 52 comprises a plurality of fingers 58 defining said receiving space 57 and extending in the overlap direction D1 between the teeth of the first gear 23 to seal the intermediate spaces between said teeth. The second surface section 54 is formed at the distal ends of said fingers 58.

As shown in FIGS. 3-7, the pump volume V1 of the first gear pump 2 is defined in the overlap direction D1 between the aforementioned first sealing surface 45 at the holding member 4 and the aforementioned second sealing surface 55 at the adjustment member 5. The adjustment member 5 is movable towards the holding member 4 in the overlap direction D1, thereby providing a relative movement of the second gear 24 with respect to the first gear 23 in said overlap direction D1. In particular, the second gear 24 is at least partially moved out of the meshing overlap with the first gear 23, wherein the part of the second gear 24 that is no longer in meshing overlap with the first gear 23 is passed through the opening 46 in the first sealing surface 45. Hence, said part of the second gear 24 is effectively sealed off from the pump volume V1 of the first gear pump 2. Similarly, the first gear 23, which is held by the holding member 4, is at least partially received in the opening 56 of the approaching second sealing surface 55. Again, the part of the first gear 23 that is received through said opening 56 is effectively sealed off from the pump volume V1 of the first gear pump 2.

Figure 3:
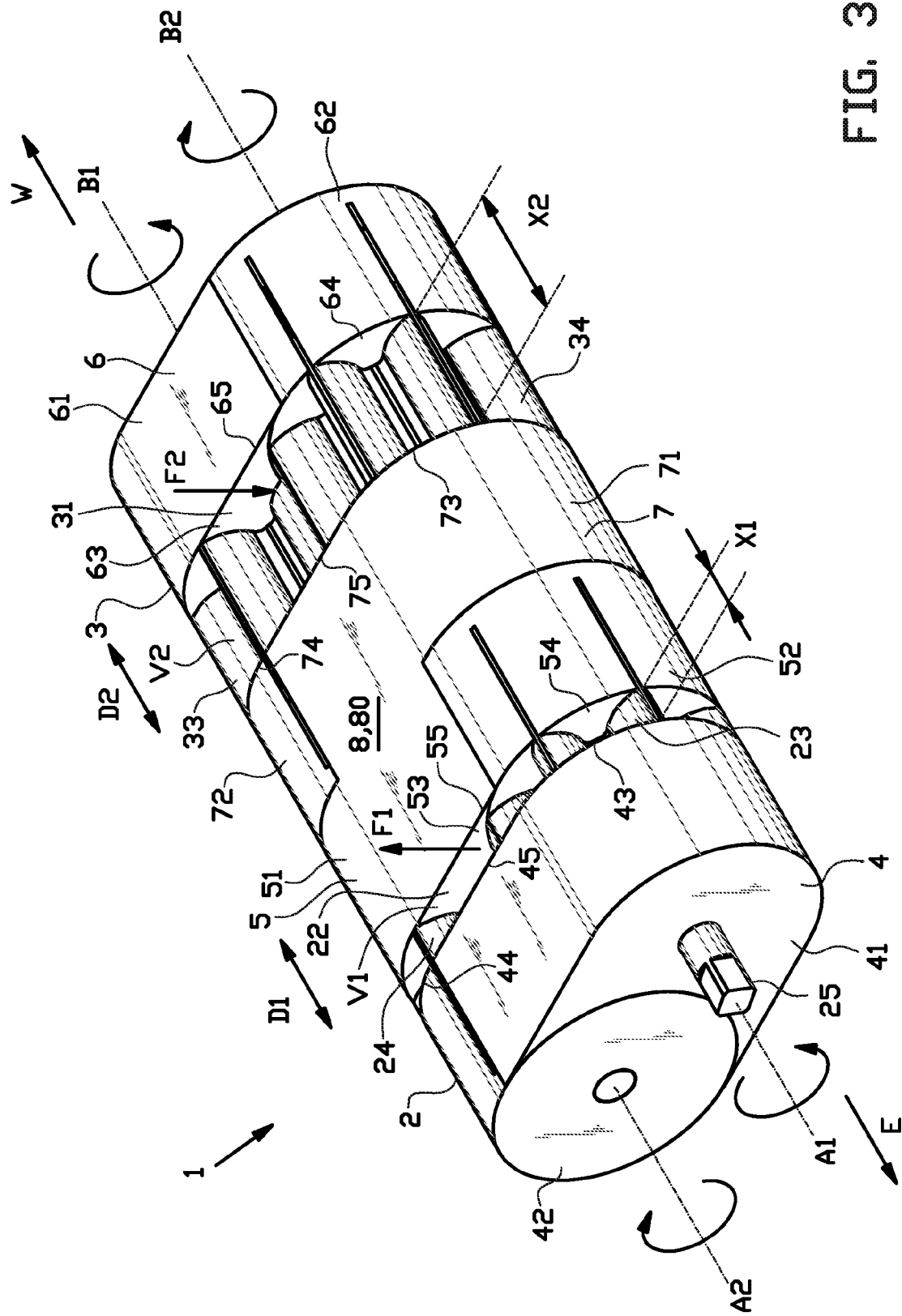
FIG. 3 shows an isometric view of the continuously variable transmission of FIG. 1 without its housing.
Figure 4:
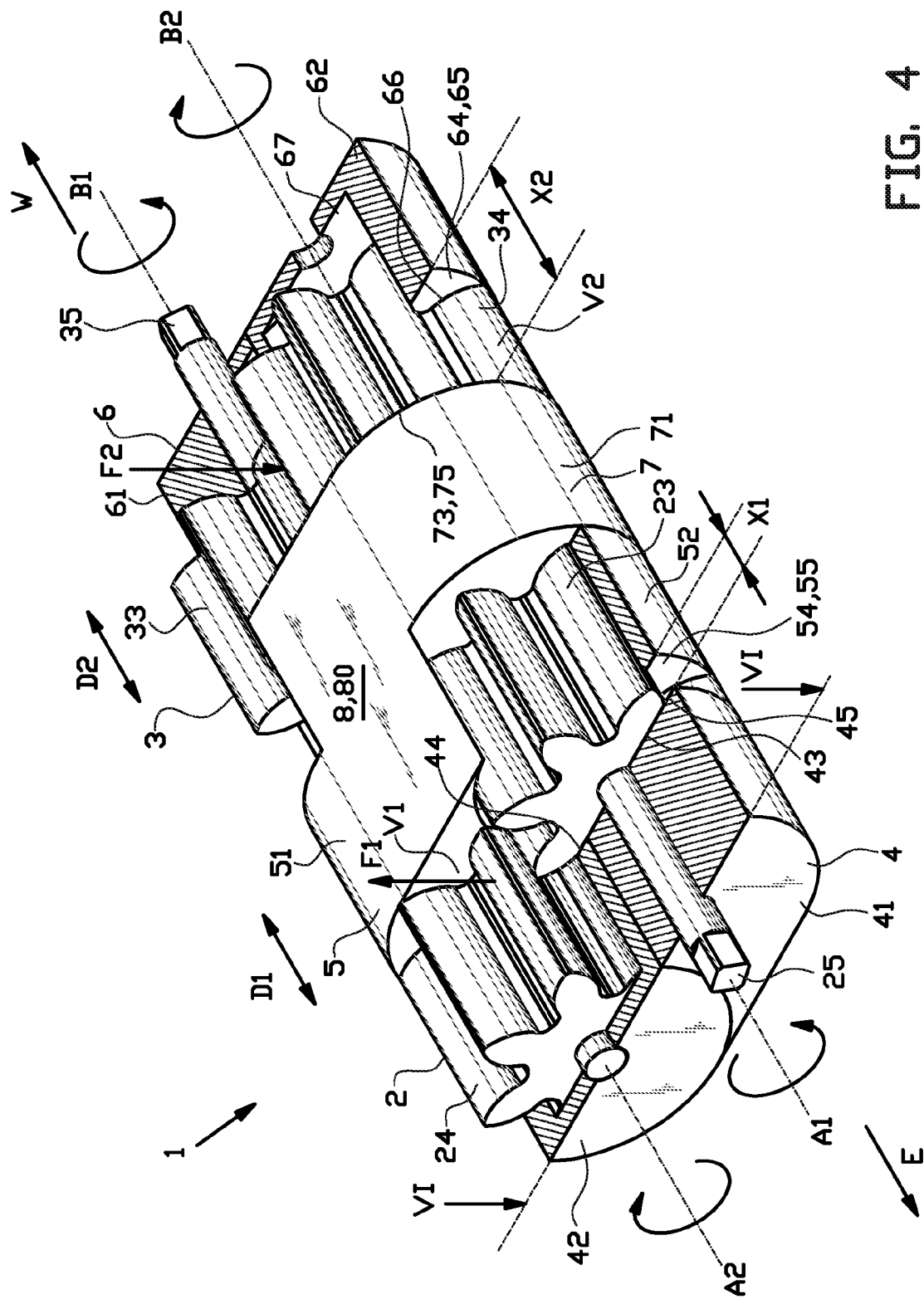
FIG. 4 shows a partial cross section of the continuously variable transmission according to line IV-IV in FIG. 1, with the transmission in a first transmission position.
Figure 6:
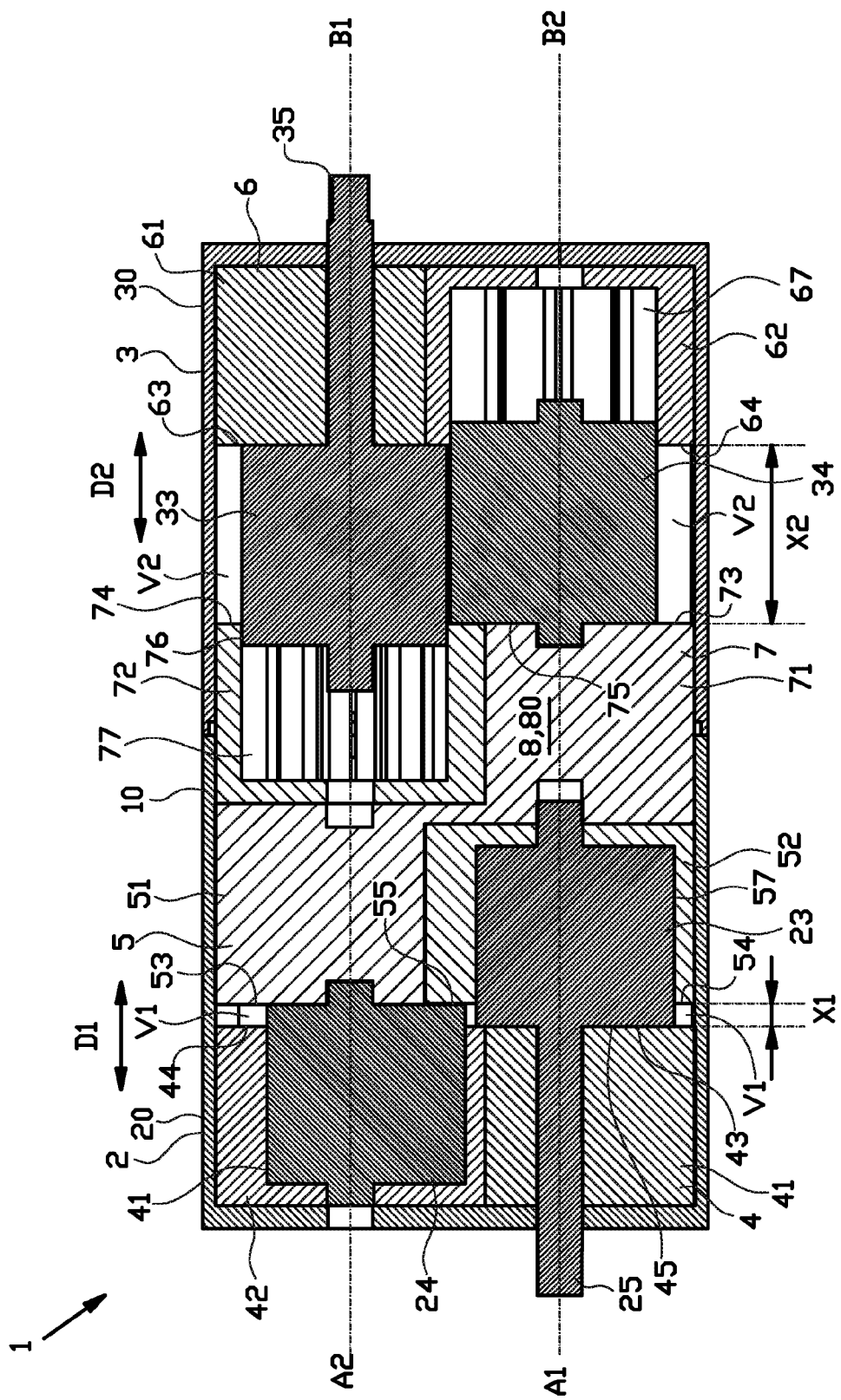
FIGS. 6 and 7 show cross sections of the continuously variable transmission according to line VI-VI in FIG. 4 and line VII-VII in FIG. 5, respectively.

As a result of the movement of the adjustment member 5 in the overlap direction D1 between the positions as shown in FIGS. 4 and 6, the meshing overlap distance X1 between the first gear 23 and the second gear 24 of the first gear pump 2 can be adjusted. In FIGS. 3, 4 and 6, the meshing overlap distance X1 in the first gear pump 2 is relatively small. In FIGS. 5 and 7, the meshing overlap distance X1 has been increased by a factor of at least four, preferably at least six and most preferably at least seven. In other words, the capacity of the first gear pump 2 has been at least quadrupled.

As best seen in FIG. 2, the second gear pump 3, like the first gear pump 2, comprises a second housing part 30, a fluid inlet 31 and a fluid outlet 32. As shown in FIGS. 3-7, a pump volume V2 is defined that extends between the fluid inlet 31 and the fluid outlet 32 of FIG. 2. In this exemplary embodiment, the first housing part 20 and the second housing part 30 are arranged to be mounted together to form a single housing 10 for both gear pumps 2, 3, as for example shown in FIG. 1. The housing 10 comprises a first duct 11 that connects the fluid outlet 22 of the first gear pump 2 in fluid communication to the fluid inlet 31 of the second gear pump 3 and a second duct 12 that connects the fluid outlet 32 of the second gear pump 3 in fluid communication to the fluid inlet 21 of the first gear pump 2. As such, the ducts 11, 12 of the housing 10 form a closed hydraulic circuit between the two pump volumes V1, V2. Hence, a fluid flow F1, F2 can be generated through the first gear pump 2 and subsequently through the second gear pump 3, as schematically show in FIGS. 3-5 and 8.

As shown in FIGS. 2-7, the second gear pump 3 further comprises a first gear 33 and a second gear 34 which are rotatable about a first gear axis B1 and a second gear axis B2, respectively. Like the gears 23, 24 of the first gear pump 2, the teeth of the gears 33, 34 of the second gear pump 3 are meshing over an overlap distance X2 in an overlap direction D2 to displace fluid through the pump volume V2 of the second gear pump 3 from the respective fluid inlet 31 to the respective fluid outlet 32. In this exemplary embodiment, the first gear axis A1 of the first gear pump 2 and the second gear axis B2 of the second gear pump 3 are coaxial, collinear or aligned and the second gear axis A2 of the first gear pump 2 and the first gear axis B1 of the second gear pump 3 are coaxial, collinear or aligned.

The second gear pump 3 essentially operates in the same way as the first gear pump 2 and—as such—has substantially the same parts. Said parts will only be briefly introduced hereafter as there operation and interaction is the same as operation and interaction of their counterparts in the first gear pump 2. The second gear pump 3, like the first gear pump 2, is provided with a holding member 6 and an adjustment member 7 that together with the second housing part 30 bound and/or define the pump volume V2 of the second gear pump 3. Also like the first gear pump 2, the adjustment member 7 is movable in the overlap direction D2 of the second gear pump 3 towards and away from the holding member 6 to adjust the pump volume V2 of the second gear pump 3.

As best seen in FIGS. 2-6, the holding member 6 of the second gear pump 3 is provided with a base 61 and a receptacle 62 forming a first surface section 63 and a second surface section 64, respectively. Together, said surface sections 63, 64 form a first sealing surface 65 for sealing the pump volume V2 of the second gear pump 3 in the overlap direction D2 at the side of the holding member 6. The second surface section 64 is rotatable with respect to the first surface section 63 about the second gear axis B2 together with the second gear 34 and is provided with an opening 66 and a receiving space 67 with a contour that is a negative of the contour of the second gear 34.

As best seen in FIGS. 2, 3 and 6, the adjustment member 7 comprises a base 71 and a receptacle 72 forming a first surface section 73 and a second surface section 74, respectively. Together, said surface sections 73, 74 form a second sealing surface 75 for sealing the pump volume V2 of the second gear pump 3 in the overlap direction D2 at the side of the adjustment member 7. The second surface section 74 is rotatable with respect to the first surface section 73 about the first gear axis B1 together with the first gear 33 and is provided with an opening 76 and a receiving space 77 with a contour that is a negative of the contour of the first gear 33.

As shown in FIG. 3-7, the pump volume V2 of the second gear pump 3 is defined in the overlap direction D2 between the aforementioned first sealing surface 65 at the holding member 6 and the aforementioned second sealing surface 75 at the adjustment member 7. The adjustment member 7 is movable towards the holding member 6 in the overlap direction D2. As a result of the movement of the adjustment member 7 in the overlap direction D2, the meshing overlap distance X2 between the first gear 33 and the second gear 34 of the second gear pump 3 can be adjusted. In FIGS. 3, 4 and 6 the meshing overlap distance X2 in the second gear pump 3 is larger than the meshing overlap distance X1 of the first gear pump 2. In FIGS. 5 and 7, the meshing overlap distance X2 has been decreased by a factor of at least four, preferably at least six and most preferably at least seven. In other words, the capacity of the second gear pump 3 has been reduced by a factor of at least four.

As shown in FIGS. 3-7, the continuously variable transmission 1 is provided with a connecting member 8 that connects the adjustment member 5 of the first gear pump 2 and the adjustment member 7 of the second gear pump 3 to each other. In this exemplary embodiment, the connecting member 8 is a connecting body 80 that extends between and/or is integral with the adjustment member 5 of the first gear pump 2 and the adjustment member 7 of the second gear pump 3. Hence, any movement of the adjustment member 5 of the first gear pump 2 is directly transmitted onto and/or converted into a movement of the adjustment member 7 of the second gear pump 3. In particular, the connecting member 8 is connected to the respective adjustment members 5, 7 such that the pump volume V1 of the first gear pump 2 and the pump volume V2 of the second gear pump 3 are adjusted in an inverse correlation to each other. This means that when the pump volume V1 of the first gear pump 2 is decreased, the pump volume V2 of the second gear pump 3 is increased and that when the pump volume V1 of the first gear pump 2 is increased, the pump volume V2 of the second gear pump 3 is decreased.

More specifically, in this exemplary embodiment, the inverse correlation is an inverse proportionality, meaning that the movement of the adjustment member 5 of the first gear pump 2 relates to the movement of the adjustment member 7 of the second gear pump 3 in a fixed ratio and/or with a certain coefficient. In this example, the inverse proportionality is such that the ratio between an increase of one of the first pump volume V1 and the second pump volume V2 and a decrease of the other of the first pump volume V1 and the second pump volume V2 is 1:1 and/or the coefficient of the inverse proportionality is minus one. By having said ratio or said coefficient, the combined capacity of the pump volumes V1, V2 of both the first gear pump 2 and the second gear pump 3 remains constant. Hence, the gear pumps 2, 3 can be operated in a closed hydraulic circuit in which the decrease in volume of one of the two pump volumes V1, V2 is absorbed by an equal increase in volume of the other of the two pump volumes V1, V2.

By changing the pump volumes V1, V2 of both gear pumps 2, 3 in an inverse correlation, one of the two gear pumps 2, 3 will run faster than the other of the two gear pumps 2, 3. In particular, in a closed hydraulic system in which the fluid inlets 21, 31 of each of the gear pumps 2, 3 is connected in fluid communication to fluid outlet 22, 32 of the other of the gear pumps 2, 3, the volumetric amount of fluid pumped through both gear pumps 2, 3 is the same. Hence, the gear pump 2, 3 with the smallest pump volume V1, V2 will tend to rotate the fastest to maintain the same volumetric flow rate with a reduced capacity. Similarly, the gear pump 2, 3 with the largest pump volume V1, V2 will tend to rotate the slowest to maintain the same volumetric flow rate with an increased capacity. Hence, the transmission ratio, i.e. the ratio between the pump volume V1 of the first gear pump 2 and the pump volume V2 of the second gear pump 3 can be changed effectively by simply moving the adjustment members 5, 7 of both gear pumps 2, 3 in the aforementioned inverse correlation to each other.

Preferably, the adjustment members 5, 7 of both gear pumps 2, 3 are movable in the respective overlap directions D1, D2 to obtain a transmission ratio range of at least 1:4 to 4:1, i.e. one revolution of the first gear pump 2 equates to four revolutions of the second gear pump 3 and vice versa. More preferably the adjustment members 5, 7 of both gear pumps 2, 3 are movable in the respective overlap directions D1, D2 to obtain a transmission ratio range of at least 1:6 to 6:1 and most preferably at least 1:7 to 7:1. Essentially, any transmission ratio can be obtained in which the volumetric amount of fluid being pumped through the smallest pump volume V1, V2 is still effective and/or efficient in driving the rotation of the respective gear pump 2, 3. It is noted that the adjustment member 5 of the first gear pump 2 and the adjustment member 7 of the second gear pump 3 are steplessly movable in the respective overlap directions D1, D2. Hence, a continuously and/or steplessly variable transmission 1 can be obtained in which any transmission ratio within the range of the adjustment members 5, 7 can be selected.

As schematically shown in FIG. 1, the continuously variable transmission further comprises a control member 9 that is operationally coupled to the adjustment member 5 of the first gear pump 2, the adjustment member 7 of the second gear pump 3 or the connecting member 8 in FIG. 2 to control the adjustment of the pump volumes V1, V2 of the first gear pump 2 and the second gear pump 3. The control member 9 may be mechanical component that is suitable connected to one of the aforementioned parts of the transmission 1 to move in unison with said part. Preferably, the control member 9 is arranged on the outside of the housing 10 for manual operation, e.g. a gear lever or a gear stick that connects to the connecting member 8 through a suitably shaped slot (not shown) in the housing 10.

As shown in FIGS. 1-7, one of the gears 23, 24 of the first gear pump 2 is connectable to or provided with an input axle or input shaft 25 for mechanically inputting a rotary motion into the continuously variable transmission 1. In this exemplary embodiment, the first gear 23 is provided with said input shaft 25. Hence, said first gear 23 can be regarded as the drive gear of the first gear pump 2, while the second gear 24 is can be regarded as the idler gear of the first gear pump 2. As further shown in FIGS. 2 and 4-7, one of the gears 33, 34 of the second gear pump 3 is connectable to or provided with an output axle or output shaft 35 for mechanically outputting a rotary motion out of the continuously variable transmission 1. In this exemplary embodiment, the first gear 33 is provided with said output shaft 35. Hence, said first gear 33 can be regarded as the drive gear of the second gear pump 3, while the second gear 34 can be regarded as the idler gear of the second gear pump 3.

The input shaft 25 can be connected directly or indirectly to a source of energy, preferably a source of mechanical energy, e.g. an output shaft of a vehicle engine (only schematically shown with arrow E in FIG. 1). The output shaft 35 can be connected directly or indirectly to parts to be driven, e.g. the wheels of a vehicle (only schematically shown with arrow W in FIG. 1). In the example of a vehicle, the transmission 1 according to the invention thus forms a continuously variable mechanical-hydraulic transmission 1 that is arranged for hydraulically converting the mechanical rotation of an engine into a mechanical rotation of the wheels according to a continuously variable transmission ratio.

FIGS. 9-15 show an alternative continuously variable transmission 101 according to a second embodiment of the invention. Said alternative transmission 101 differs from the aforementioned transmission 1 in that it comprises a first gear pump 102 with a telescopic first gear 123, a telescopic second gear 124 and a second gear pump 103 with a telescopic third gear 133 and a telescopic fourth gear 134. Hence, the alternative transmission 101 does not require any receptacles as in the previously discussed transmission. The overlap distance X1, X2 between the meshing telescopic gears 123, 124; 133, 134 is simply adjusted by changing the telescopic length of the telescopic gears 123, 124; 133, 134 in the respective overlap directions D1, D2.

Figure 10:
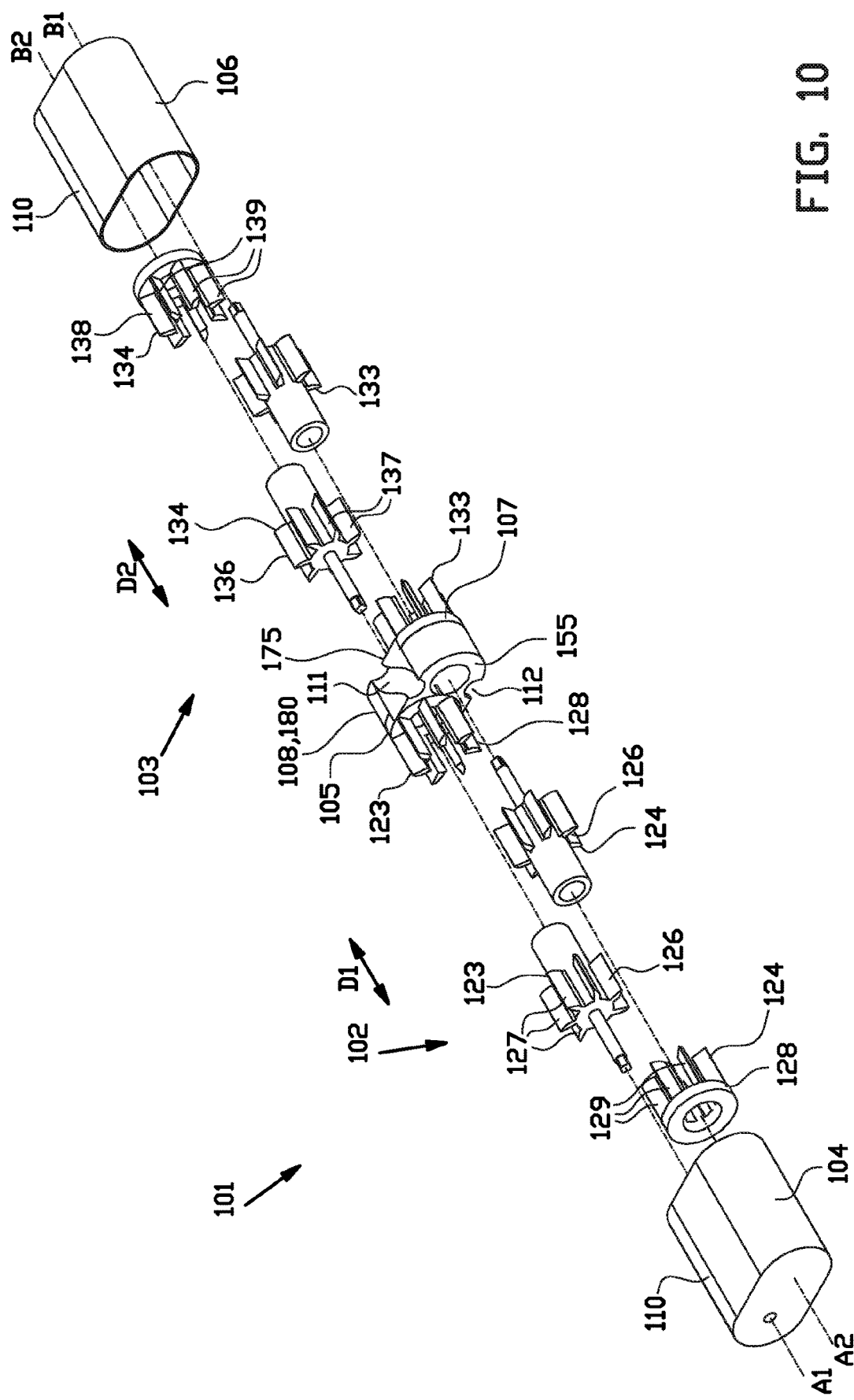
FIG. 10 shows an exploded view of the alternative continuously variable transmission according to FIG. 9.
Figure 11:
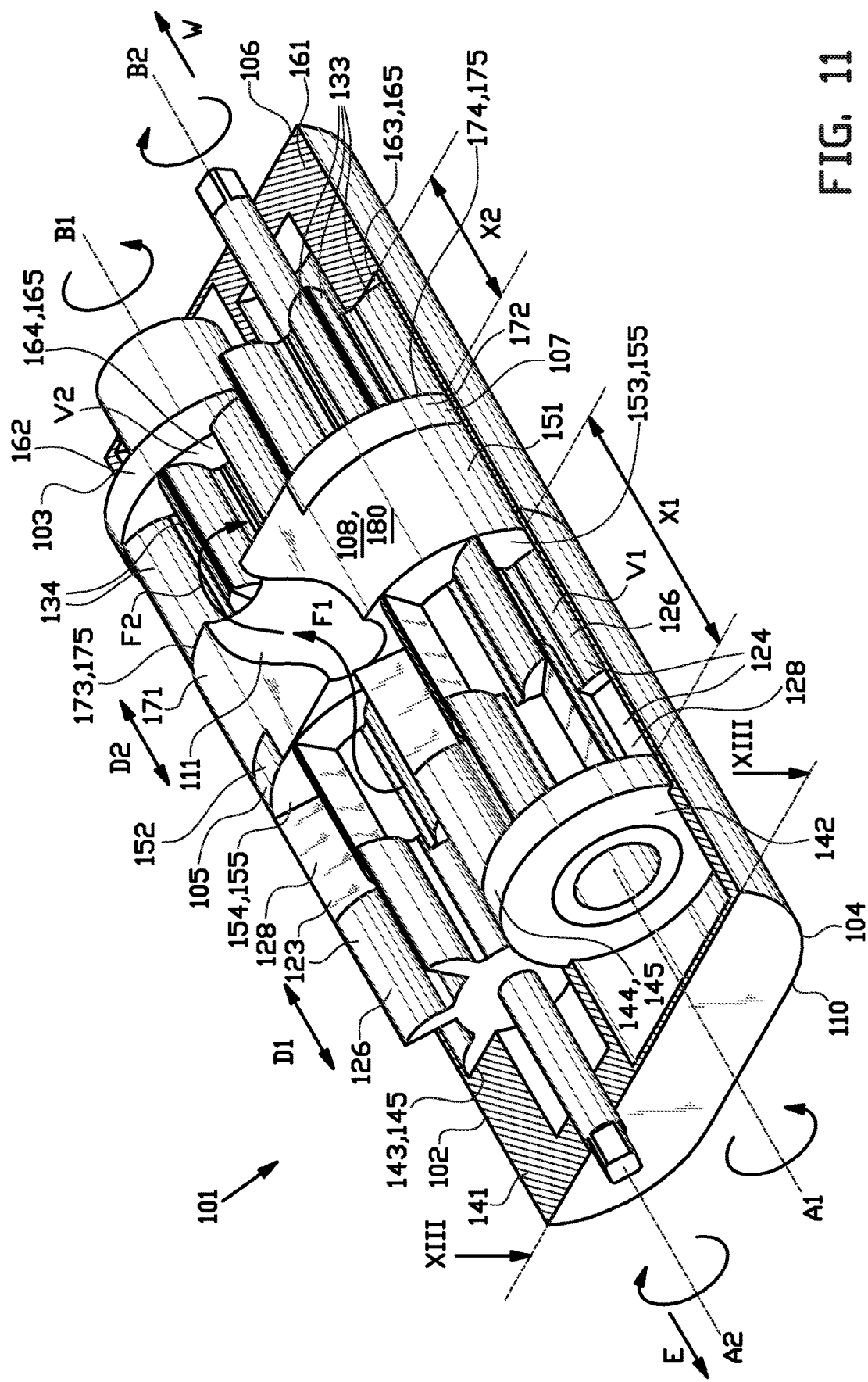
FIG. 11 shows a partial cross section of the alternative continuously variable transmission according to line XI-XI in FIG. 9, with the alternative continuously variable transmission in a first transmission position.
Figure 12:
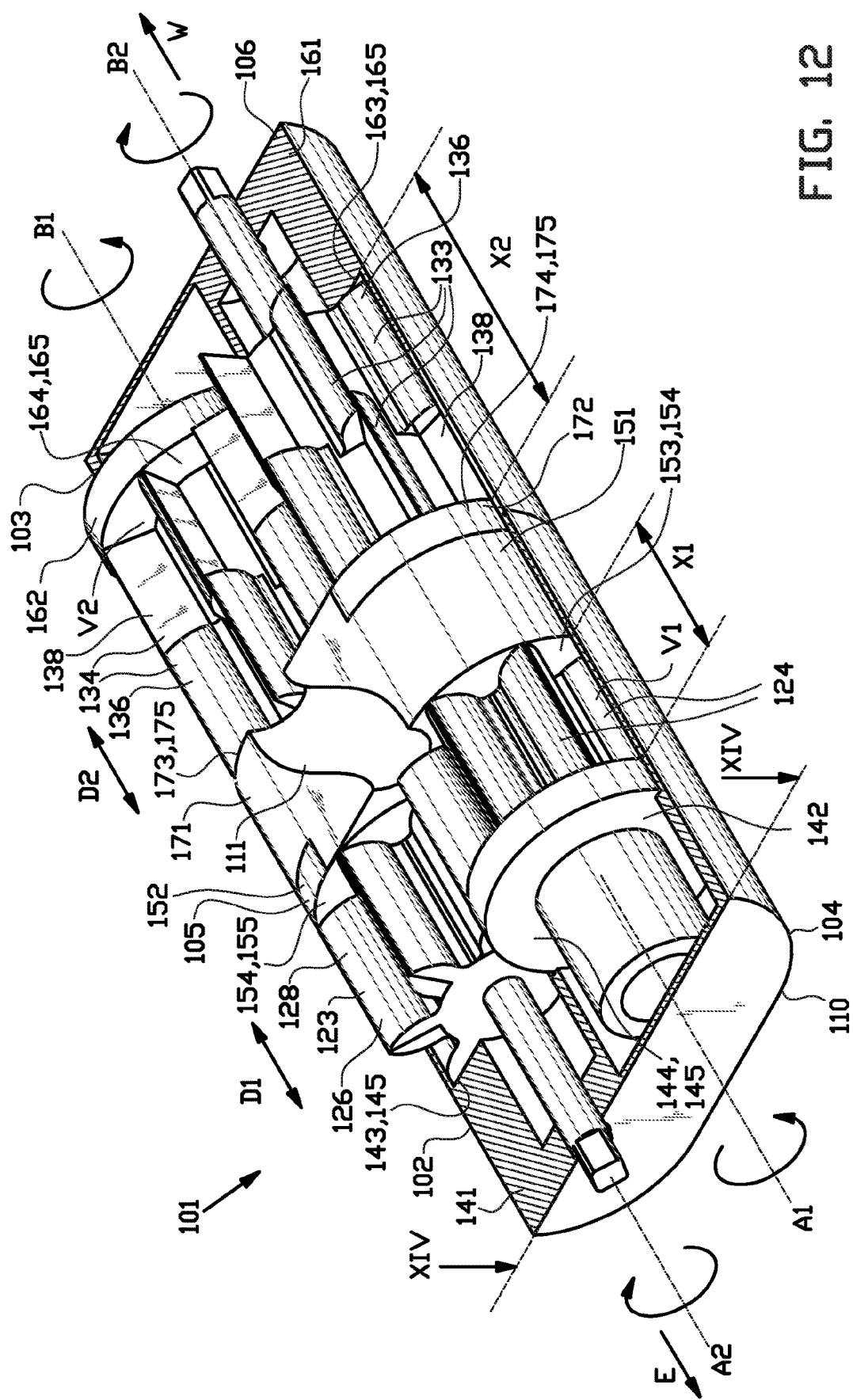
FIG. 12 shows the partial cross section of the alternative continuously variable transmission according to FIG. 11, with the alternative continuously variable transmission in a second transmission position.
Figure 13:
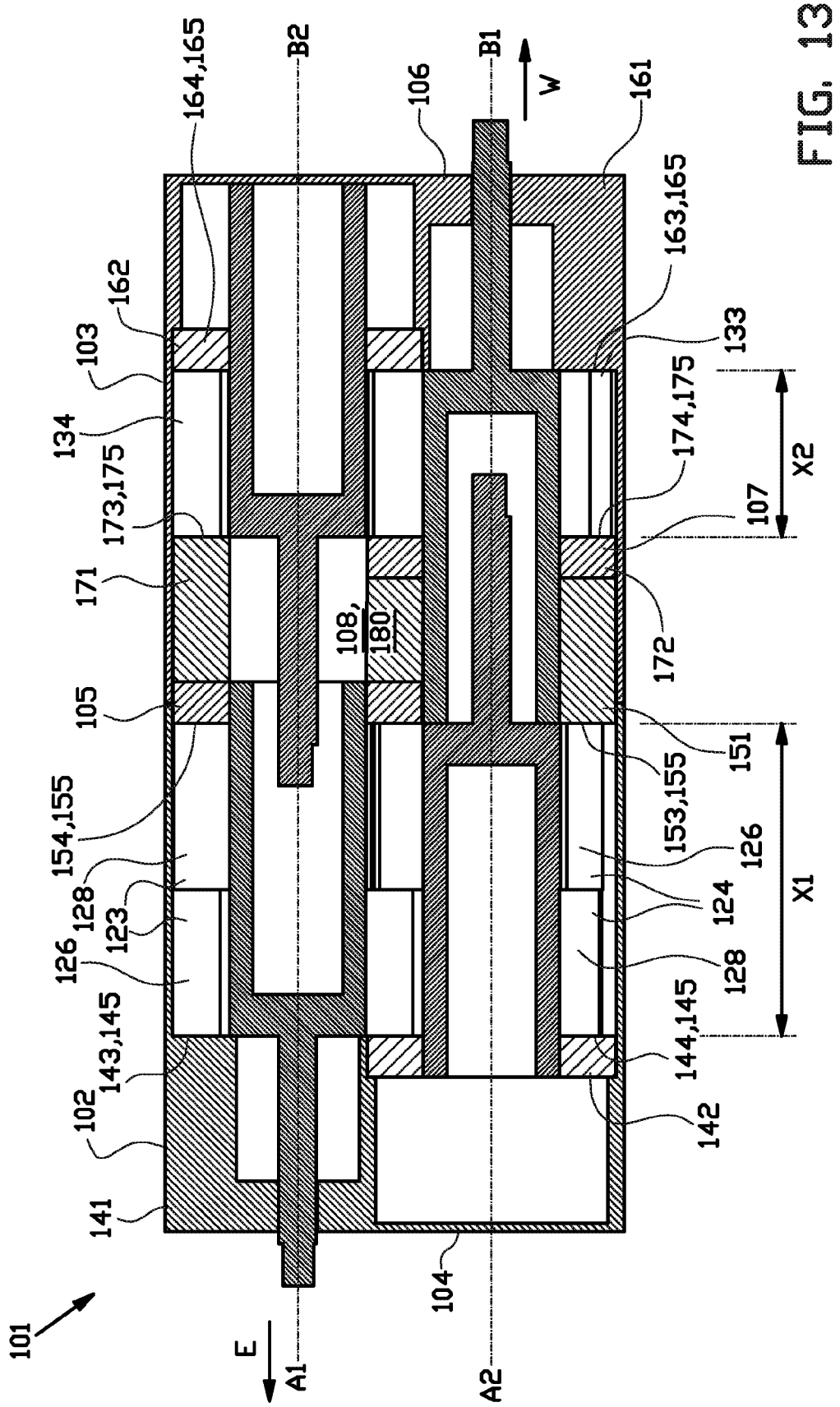
FIGS. 13 and 14 show cross sections of the alternative continuously variable transmission according to line XIII-XIII in FIG. 11 and line XIV-XIV in FIG. 12, respectively.
Figure 14:
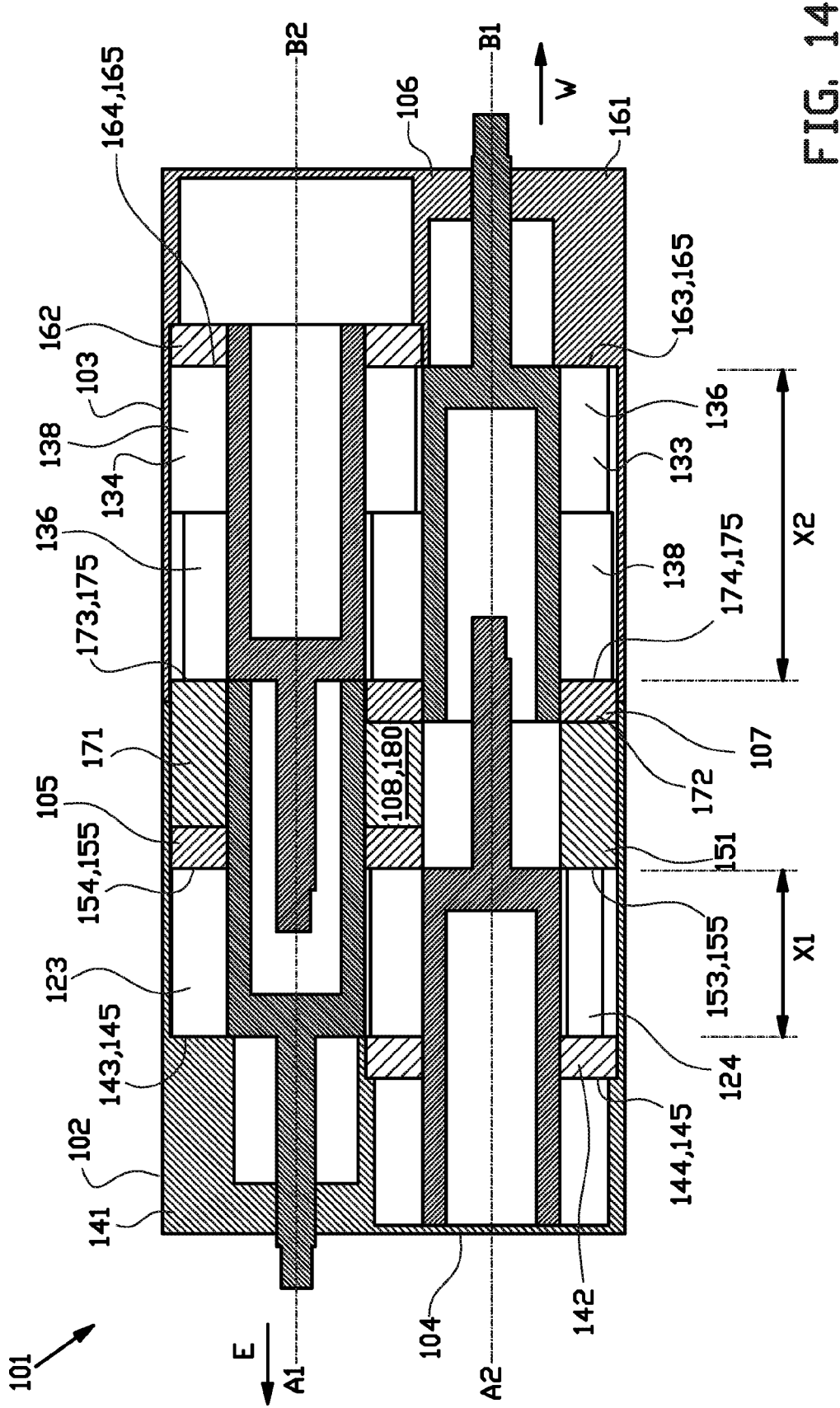
Figure 15:
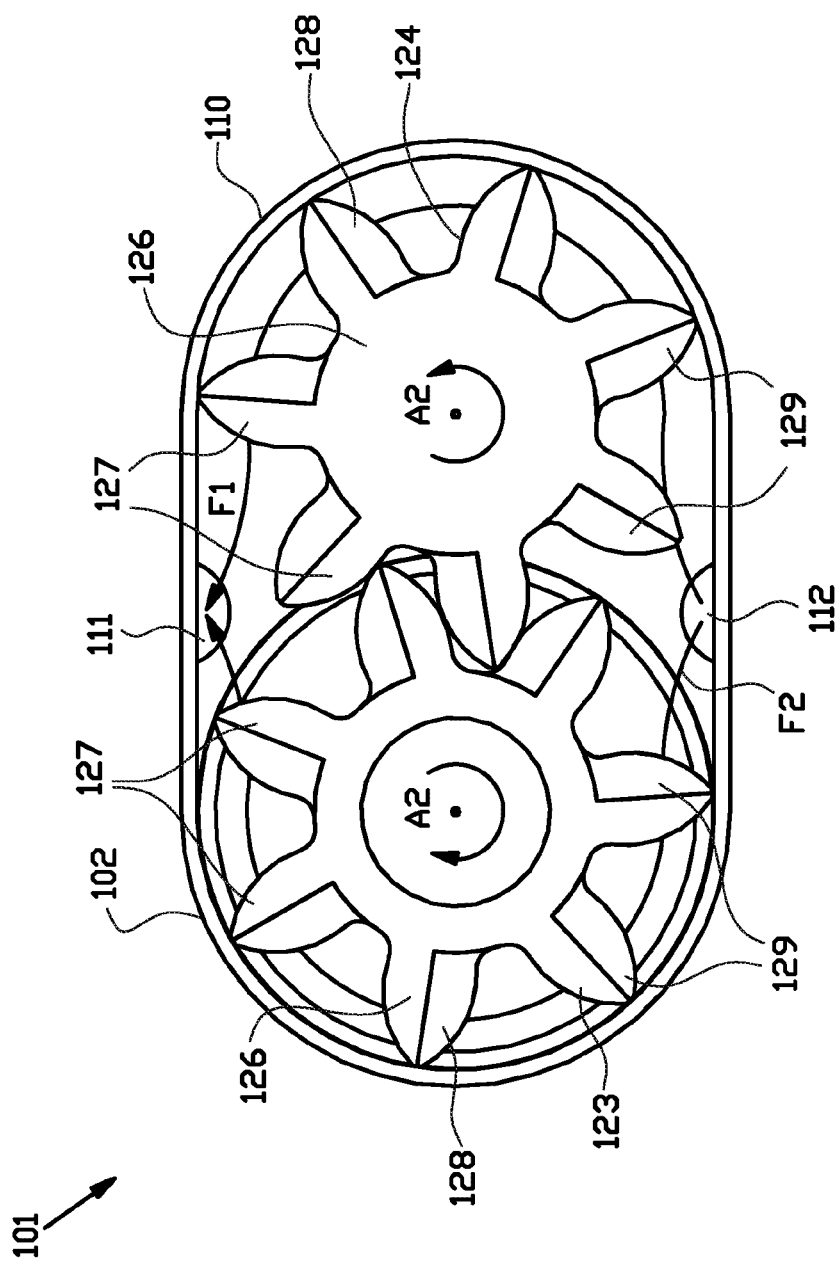
FIG. 15 shows a cross section of the continuously variable transmission according to line XV-XV in FIG. 9.
Figure 16:
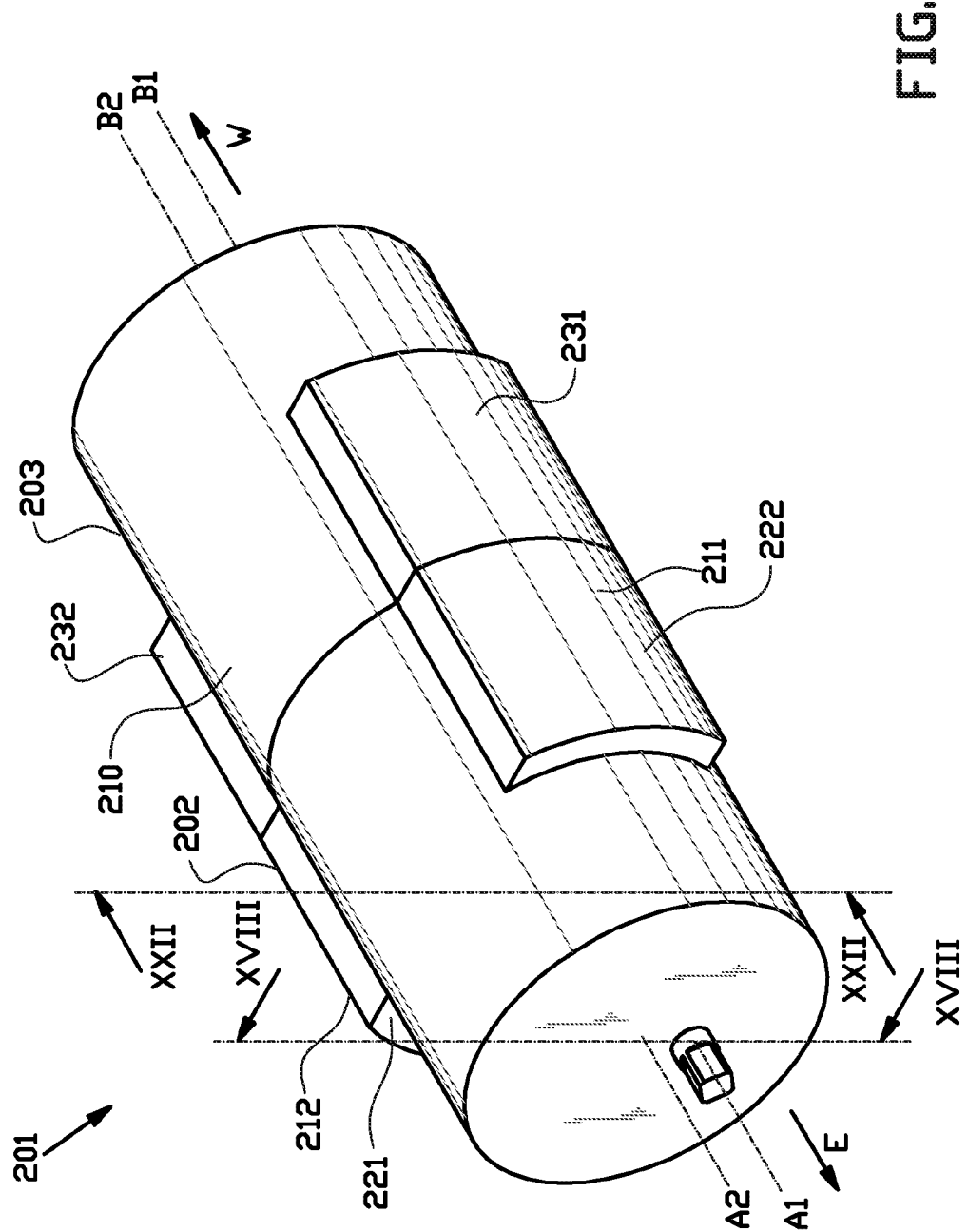
FIG. 16 shows an isometric view of a further alternative continuously variable transmission according to a third embodiment of the invention.
Figure 17:
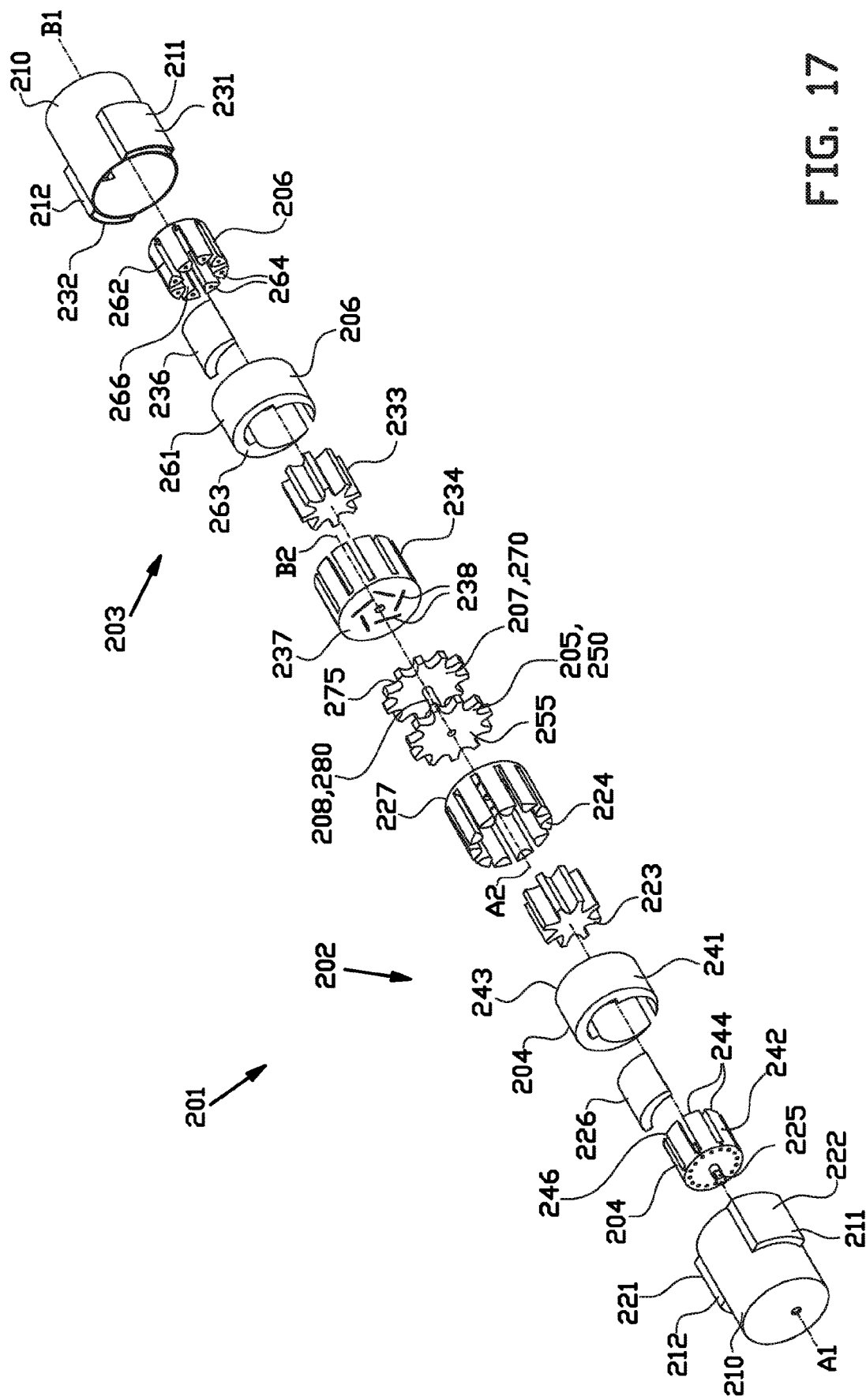
FIG. 17 shows an exploded view of the further alternative transmission according to FIG. 16.
Figure 18:
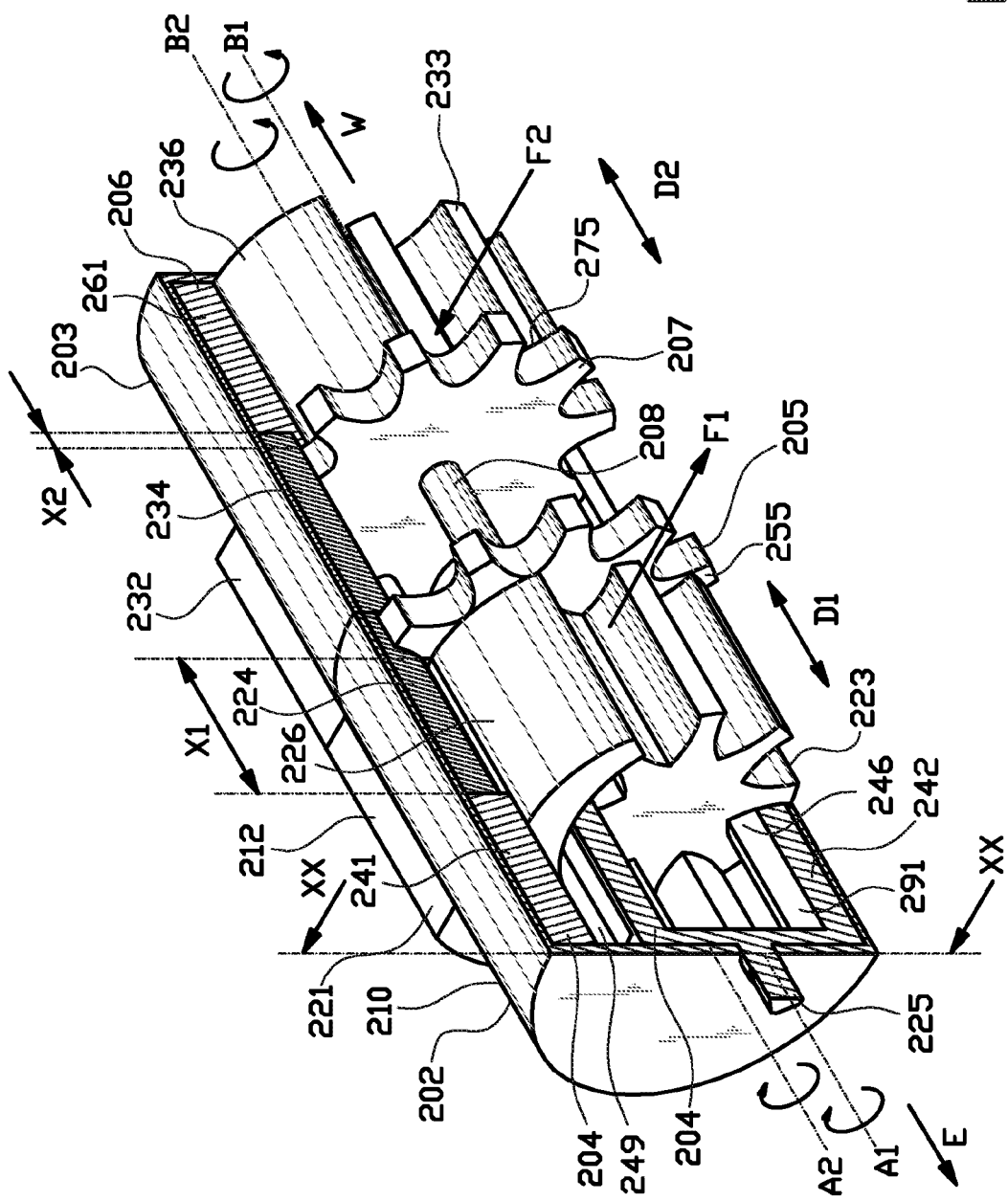
FIG. 18 shows a partial cross section of the further alternative continuously variable transmission according to line XVIII-XVIII in FIG. 16, with the further alternative continuously variable transmission in a first transmission position.

As best seen in FIG. 10, each telescopic gear comprises a first gear part 126, 136 with a plurality of first gear teeth 127, 137 distributed circumferentially about the respective gear axis A1, A2, B1, B2 and a second gear part 128, 138 with a plurality of second gear teeth 129, 139 distributed circumferentially about the same gear axis A1, A2, B1, B2. As shown in FIGS. 11-14, the first gear teeth 127, 137 and the second gear teeth 129, 139 are slidable along each other in the respective overlap direction D1, D2 for telescopically extending or contracting the respective telescopic gear 123, 124, 133, 134 in the respective overlap direction D1, D2. The first gear teeth 127,137 and the second gear teeth 129, 139 are half gear teeth, wherein each pair of one of the first gear teeth 127, 137 and one of the second gear teeth 129, 139 forms a complete gear tooth of the respective telescopic gear 123, 124, 133, 134.

As shown in FIGS. 11-14, each gear pump 102, 103 of the alternative transmission 101 comprises a holding member 104, 106 with a base 141, 161 for holding the first gear part 126, 136 of the first gear 123, 133 of the respective gear pump 102, 103 and a receptacle 142, 162 for holding the first gear part 126, 136 of the second gear 124, 134 of the respective gear pump 102, 103. The receptacle 142, 162 is rotatable with respect to the base 141, 161 about the respective second gear axis A2, B2. The base 141, 161 and the receptacle 142, 162 are provided with a first surface section 143, 163 and a second surface section 144, 164 for forming a first sealing surface 145, 165 to seal the respective pump volume V1, V2 at the side of the holding member 104, 106.

Each gear pump 102, 103 of the alternative transmission 101 further comprises an adjustment member 105, 107 with a base 151, 171 for holding the second gear part 128 of the first gear 123, 133 of the respective gear pump 102, 103 and a receptacle 152, 172 for holding the second gear part 138 of the second gear 124, 134 of the respective gear pump 102, 103. Again the receptacle 152, 172 is rotatable with respect to the base 151, 171 about the respective first gear axis A1, B1. The base 151, 171 and the receptacle 152, 172 are provided with a first surface section 153, 173 and a second surface section 154, 174 for forming a second sealing surface 155, 175 to seal the respective pump volume V1, V2 at the side of the adjustment member 105, 107. The adjustment members 105, 107 are movable in the respective overlap directions D1, D2 to towards and away from the respective holding members 104, 106 to adjust the overlap distances X1, X2 and pump volumes V1, V2 between the sealing surfaces 145, 155, 165, 175 thereof.

Similar to the transmission 1 according to the previously discussed embodiment of the invention, the adjustment members 105, 107 of the alternative transmission 101 are interconnected by a connecting member 108 that is arranged for adjusting the pump volumes V1, V2 in an inverse correlation to each other. Again, the connecting member 108 comprises a connecting body 180 that directly connects the adjustment member 105 of the first gear pump 102 to the adjustment member 107 of the second gear pump 103.

The alternative transmission 101 according to the second embodiment of the invention further differs from the previously discussed embodiment in that the first duct 111 and the second duct 112 are not provided in the housing 110. Instead said ducts 111, 112 are provided to and/or integrated in the connecting body 180 of the connecting member 108. Hence, fluid can flow from one of the two gear pumps 102, 103 to the other of the two gear pumps 102, 103 through a duct 111, 112 in the connecting body 180 (see fluid flow arrows F1, F2 in FIGS. 11 and 15).

Figure 9:
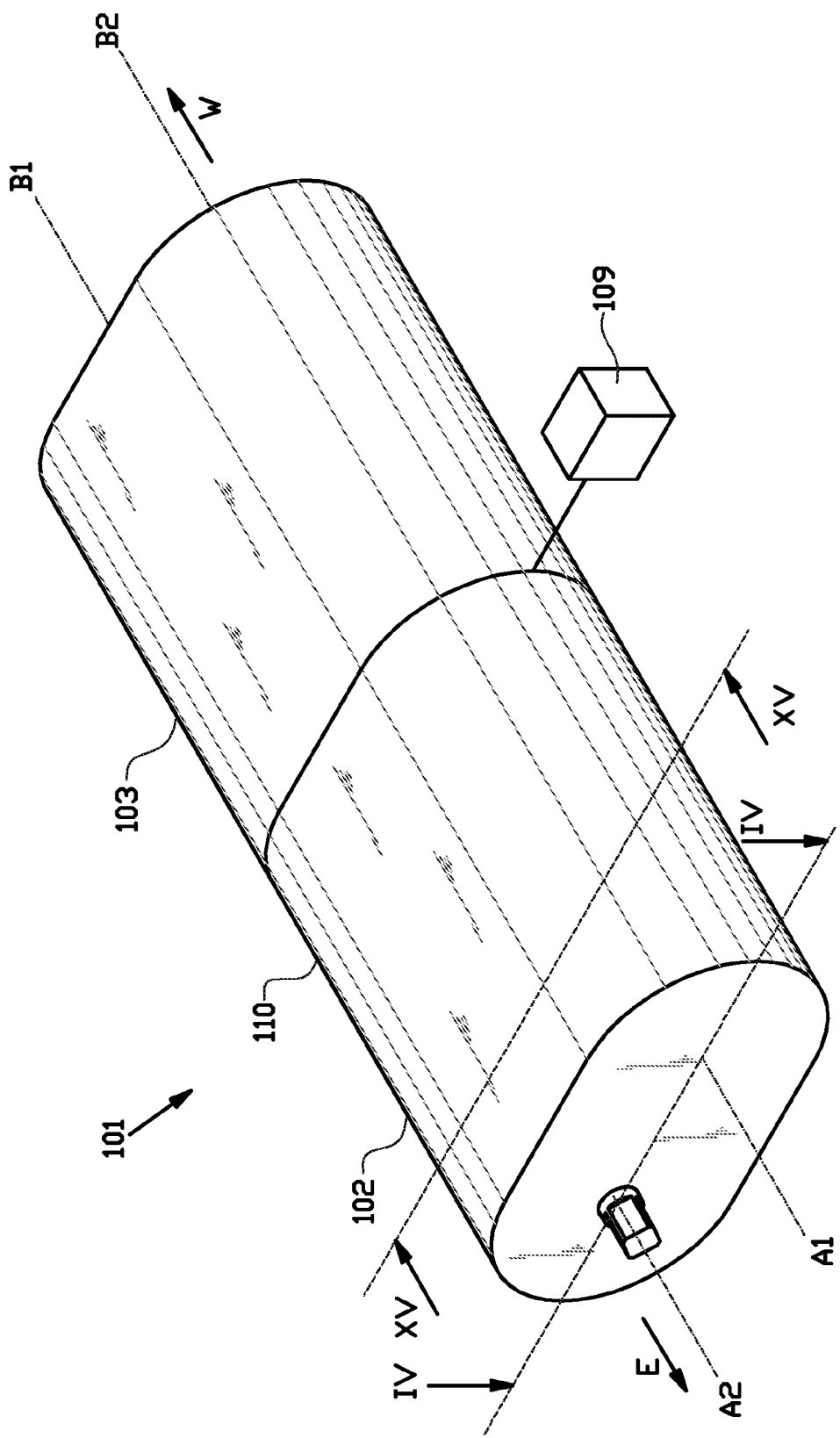
FIG. 9 shows an isometric view of an alternative continuously variable transmission according to a second embodiment of the invention.

As schematically shown in FIG. 9, the alternative transmission 101 can be controlled with a control member 109, e.g. a lever or a gear stick, in a similar way as in the previously discussed embodiment.

FIGS. 16-22 show a further alternative continuously variable transmission 201 according to a third embodiment of the invention. Said further alternative transmission 201 differs from the previously discussed transmissions 1, 101 in that it comprises a first gear pump 202 and a second gear pump 203 which are internal gear pumps. More in particular, each gear pump 202, 203 comprises a first gear 223, 233 that is an external gear and a second gear 224, 234 that is an internal gear. The external gear 223, 233 has a smaller diameter and less teeth than the internal gear 224, 234. The first gear axis A1, B1 and the second gear axis A2, B2 are offset with respect to each other. Each gear pump 202, 203 further comprises a stationary crescent 226, 236 between the external gear 223, 233 and the internal gear 224, 234. The stationary crescent 226, 236 is stationary in the circumferential direction about the first gear axis A1, B2 to guide the rotation of the external gear 223, 233 about the first gear axis A1, B1 and the rotation of the internal gear 224, 234 about the second gear axis A2, B2.

Although the gear configuration of the further alternative transmission 201 is quite different from the previously discussed embodiments, the working principle for adjusting the pump volumes V1, V2 in an inverse correlation to each other is quite similar. Again, each gear pump 202, 203 of the further alternative transmission 201 comprises a holding member 204, 206, as shown in FIG. 18-21, that presents a first sealing surface 245, 265 for sealing the respective pump volume V1, V2 at the side of the holding member 204, 206 and an adjustment member 205, 207 that presents a second sealing surface 255, 275 for sealing the respective pump volume V1, V2 at the side of the adjustment member 205, 207. The adjustment members 205, 207 are movable in the respect overlap directions D1, D2 towards and away from the respective holding members 204, 206. Again, the adjustment members 205, 207 of both gear pumps 202, 203 are interconnected by a connecting member 208, in this exemplary embodiment merely a rigid connecting rod 280, that is arranged to adjust the pump volumes V1, V2 in an inverse correlation to each other. The adjustment member 205, 207 are rotatable about the second gear axis A2, B2 with respect to said connecting rod 280.

As best seen in FIGS. 18-21, the holding members 204, 206 each comprise a base 241, 261 and a receptacle 242, 262 with a first surface section 243, 263 and a second surface section 244, 264 respectively. The receptacle 242, 262 is rotatable with respect to the base 241, 261 about the respective first axis A1, B1. The receptacle 242, 262 is arranged for at least partially receiving the external gear 223, 233 in the respective overlap direction D1, D2. In particular, said receptacle 242, 262 is provided with an opening 246, 266 that is a negative of the contour of the respective external gear 223, 233. The base 241, 261 is provided with a slot 249, 269 for at least partially receiving the stationary crescent 226, 236 in the respective overlap direction D1, D2.

In this exemplary embodiment, as shown in FIGS. 17-21, the adjustment members 205, 207 are formed as plate-like members 250, 270 that have a contour that is a negative of the internal gears 224, 234 to effectively seal the respective pump volume V1, V2 at the respective second sealing surfaces 255, 275. The plate-like members 250, 270 are rotatable together with the internal gears 224, 234 about the second gear respective second gear axes A2, B2. As shown in FIGS. 18-21, the internal gears 224, 234 remain stationary in the respective overlap directions D1, D2 while the adjustment members 205, 207 are moved in said respective overlap direction D1, D2 to seal of a portion of the internal gears 224, 234 from the respective pump volumes V1, V2. The external gears 223, 233 are arranged to be displaced by the movement of said adjustment members 205, 207 in the respective overlap directions D1, D2.

Figure 20:
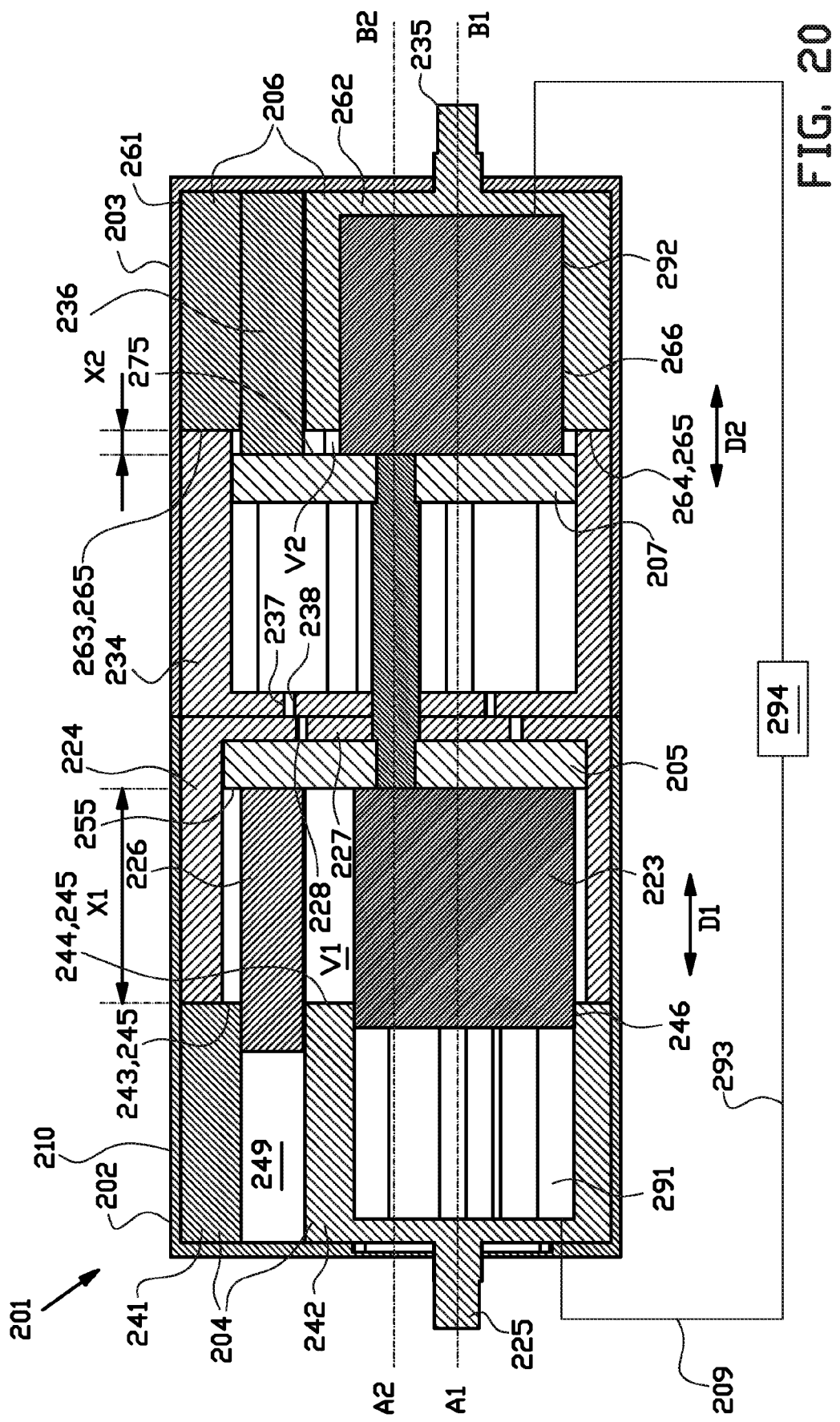
FIGS. 20 and 21 show cross sections of the further alternative continuously variable transmission according to line XX-XX in FIG. 18 and line XXI-XXI in FIG. 19, respectively.
Figure 21:
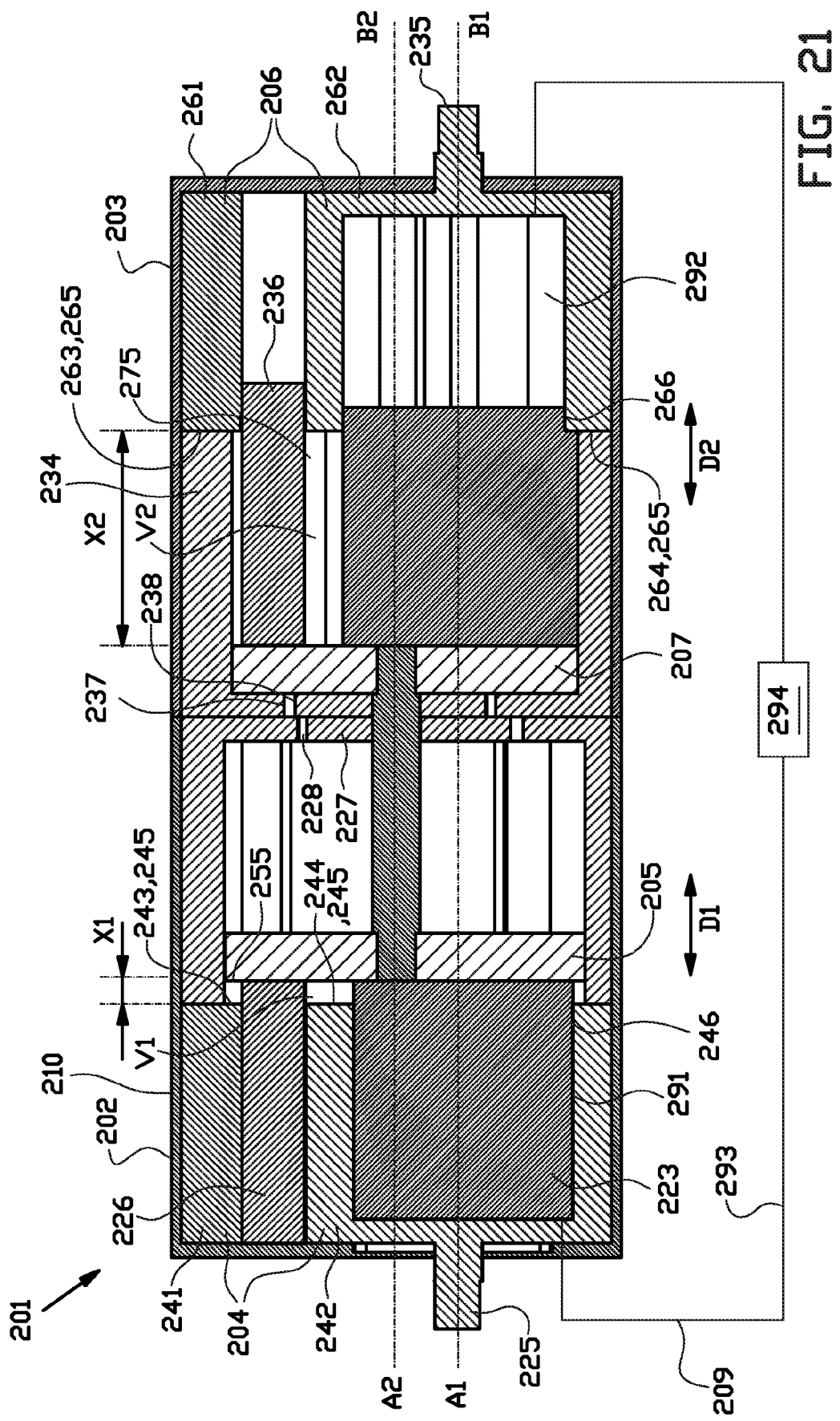

In this exemplary embodiment, the movement of the adjustment members 205, 207 and the external gears 223, 233 in the respective overlap directions D1, D2 is controlled by a hydraulic control member 209 as schematically shown in FIGS. 20 and 21. In particular, the control member 209 comprises a first chamber 291 between the receptacle 241 and the external gear 223 of the first gear pump 202 and a second chamber 292 between the receptacle 261 and the external gear 233 of the second gear pump 203. Said chambers 291, 292 are each connected via a hydraulic conduit 293 and a drive pump 294 to a source of hydraulic fluid. Preferably, the chambers 291, 292 are interconnected so that hydraulic fluid can be pumped back and forth between the chambers 291, 292. By forcing hydraulic fluid into one of the hydraulic chambers 291, 292 while allowing hydraulic fluid to escape from the other of the chambers 291, 292, the external gears 223, 233 and the adjustment members 205, 207 associated therewith can be moved in the respective overlap directions D1, D2.

Figure 19:
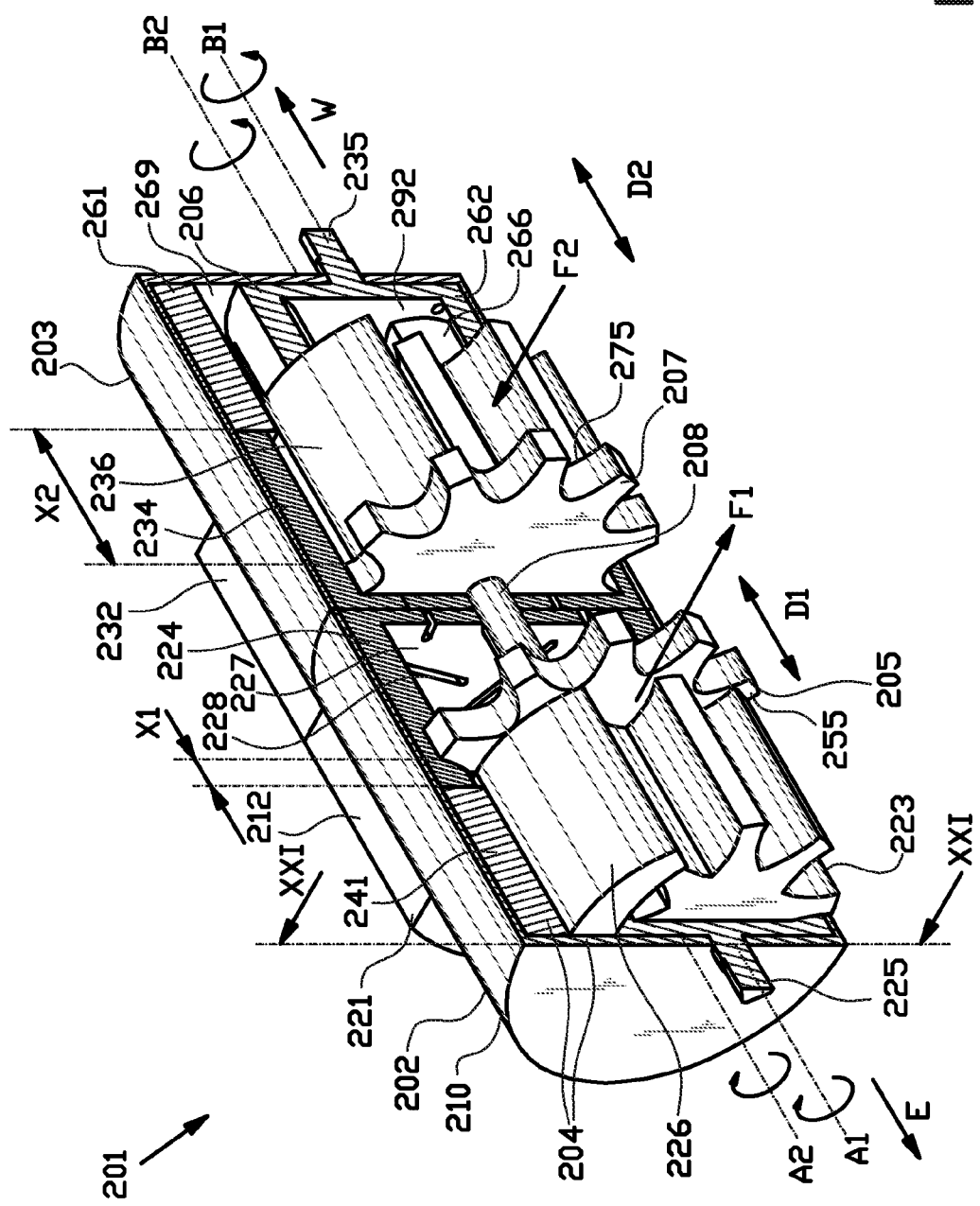
FIG. 19 shows the partial cross section of the further alternative continuously variable transmission according to FIG. 18, with the further continuously variable alternative transmission in a second transmission position.

In this exemplary embodiment, as best seen in FIG. 19, the internal gears 224, 234 are provided with intermediate walls 227, 237 extending radially through a closed volume between both adjustment members 205, 207. To facilitate the movement of the adjustment members 205, 207 with respect to this closed volume, said intermediate walls 227, 237 are provided with slits 228, 238 to allow hydraulic fluid to move from one side of the intermediate walls 227, 237 to the opposite side of said intermediate walls 227, 237. Meanwhile, the volume between the adjustment members 205, 207 remains constant.

Figure 22:
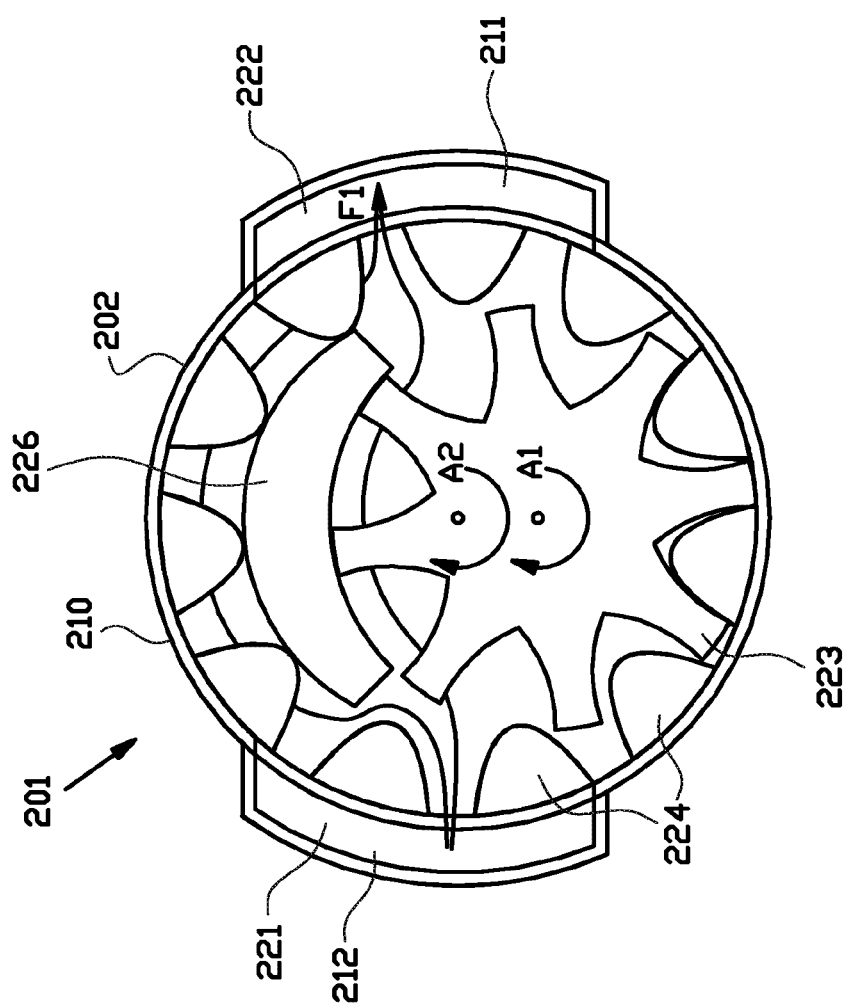
FIG. 22 shows a cross section of the continuously variable transmission according to line XXII-XXII in FIG. 16.
Figure 23:
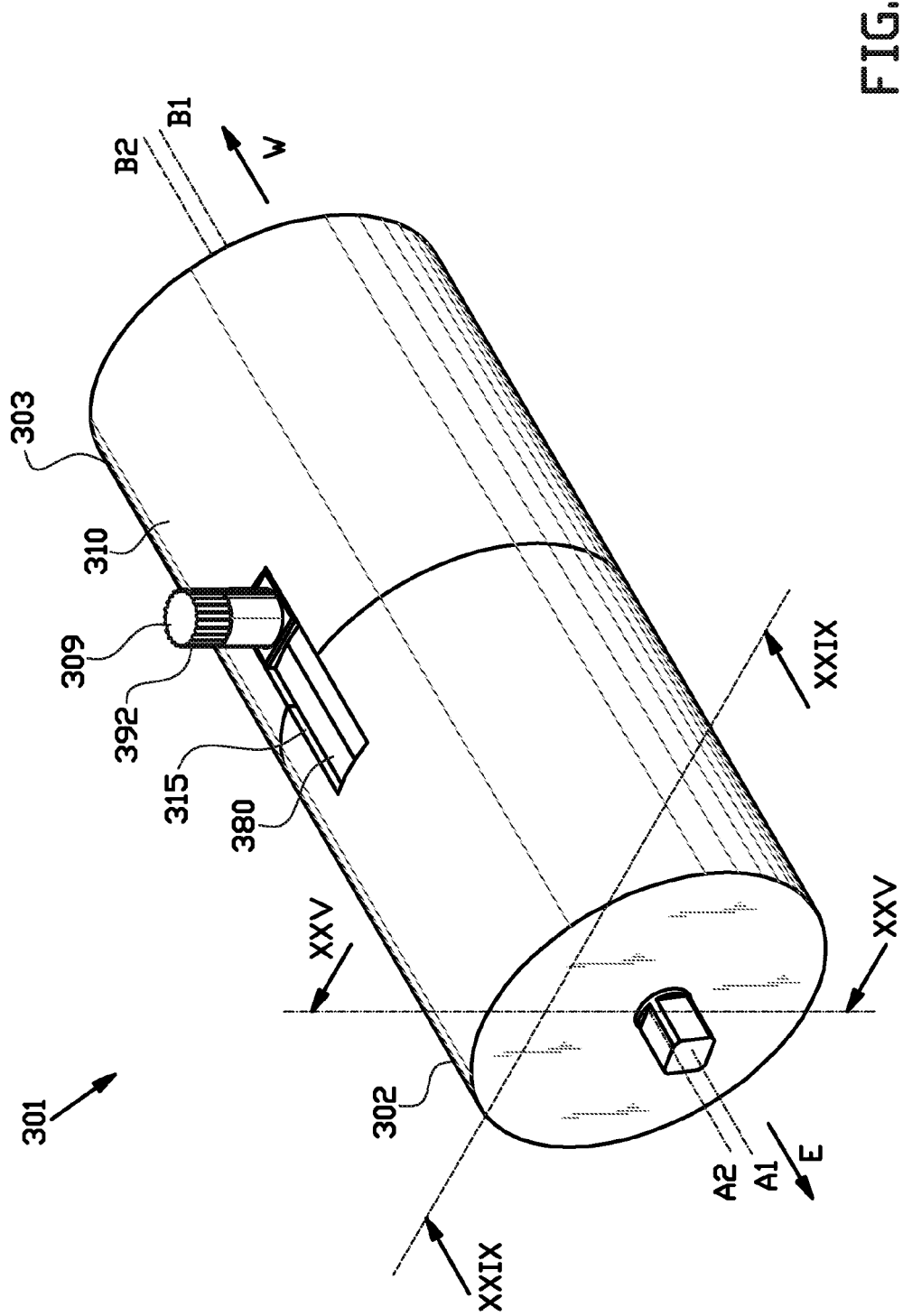
FIG. 23 shows an isometric view of a further alternative continuously variable transmission according to a fourth embodiment of the invention.

As shown in FIG. 22, the further alternative transmission 201 according to the third embodiment again has a first duct 211 and a second duct 212 on the outside of the housing 210 connecting the fluid outlet 222 of the first gear pump 202 to the fluid inlet (not shown) of the second gear pump 203 and for connecting the fluid outlet (not shown) of the second gear pump 203 to the fluid inlet 221 of the first gear pump 202.

In this exemplary embodiment, it is not the external gear 223 of the first gear pump 202 and the external gear 233 of the second gear pump 203 that are connected to the input shaft 225 and the output shaft 235, respectively. Instead, as shown in FIGS. 20 and 21, the receptacle 242 of the first gear pump 202 and the receptacle 262 of the second gear pump 203—which are arranged to rotate together with the respective external gears 223, 233 about the respective gear axes A1, B1—are connected to and/or provided with the input shaft 225 and the output shaft 235, respectively.

FIGS. 23-30B show a further alternative continuously variable transmission 301 according to a fourth embodiment of the invention. Said further alternative transmission 301 differs from the previously discussed transmissions 1, 101, 201 in that it comprises a first gear pump 302 and a second gear pump 303 which are gerotor gear pumps. The gerotor gear pumps 302, 303 according to this fourth embodiment of the invention are quite similar to the internal gear pumps 202, 203 of the transmission 201 according to the third embodiment of the invention in that they also comprise external gears 323, 333 which are meshing with internal gears 324, 334. However, unlike the previous embodiment, in which the external gears 223, 233 were movable in the respective overlap directions D1, D2, in this embodiment the external gears 323, 333 remain stationary in the respective overlap directions D1, D2 while the internal gears 324, 334 are moved over them in said respective overlap directions D1, D2. In particular, the internal gears 324, 334 are contained in a connecting member 308 in the form of an inner housing or a container 308 together with the control member Like the previous embodiments, each gear pump 302, 303 of the further alternative transmission 301 comprises a holding member 304, 306 that presents a first sealing surface 345, 365 for sealing the respective pump volume V1, V2 at the side of the holding member 304, 306 and an adjustment member 305, 307 that presents a second sealing surface 355, 375 for sealing the respective pump volume V1, V2 at the side of the adjustment member 305, 207. The adjustment members 305, 307 are movable in the respect overlap directions D1, D2 towards and away from the respective holding members 304, 306. Again, the adjustment members 305, 307 of both gear pumps 302, 303 are interconnected by the connecting member 308 that is arranged to adjust the pump volumes V1, V2 in an inverse correlation to each other. In this exemplary embodiment the container 380 of the connecting member 308 encloses both holding members 304, 306. The holding members 304, 306 are arranged for holding the external gears 323, 333. The adjustment members 305, 307 are ring-like elements which are a negative of the external gears 323, 333 and which are arranged to slide over said external gears 323, 333 to seal-off at least a part of said external gears 323, 333 from the respective pump volume V1, V2.

Figure 24:
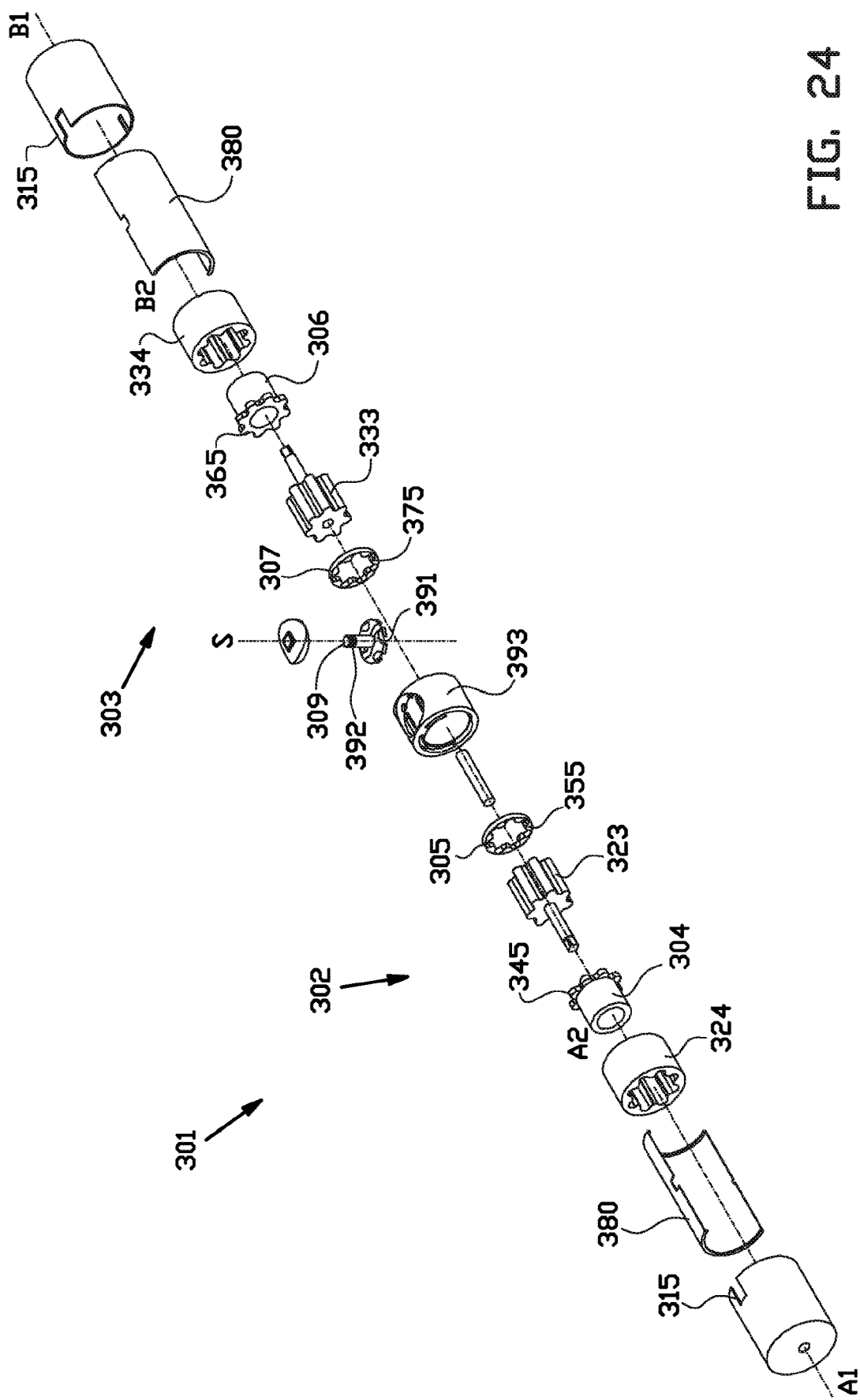
FIG. 24 shows an exploded view of the further alternative continuously variable transmission according to FIG. 23.
Figure 25:
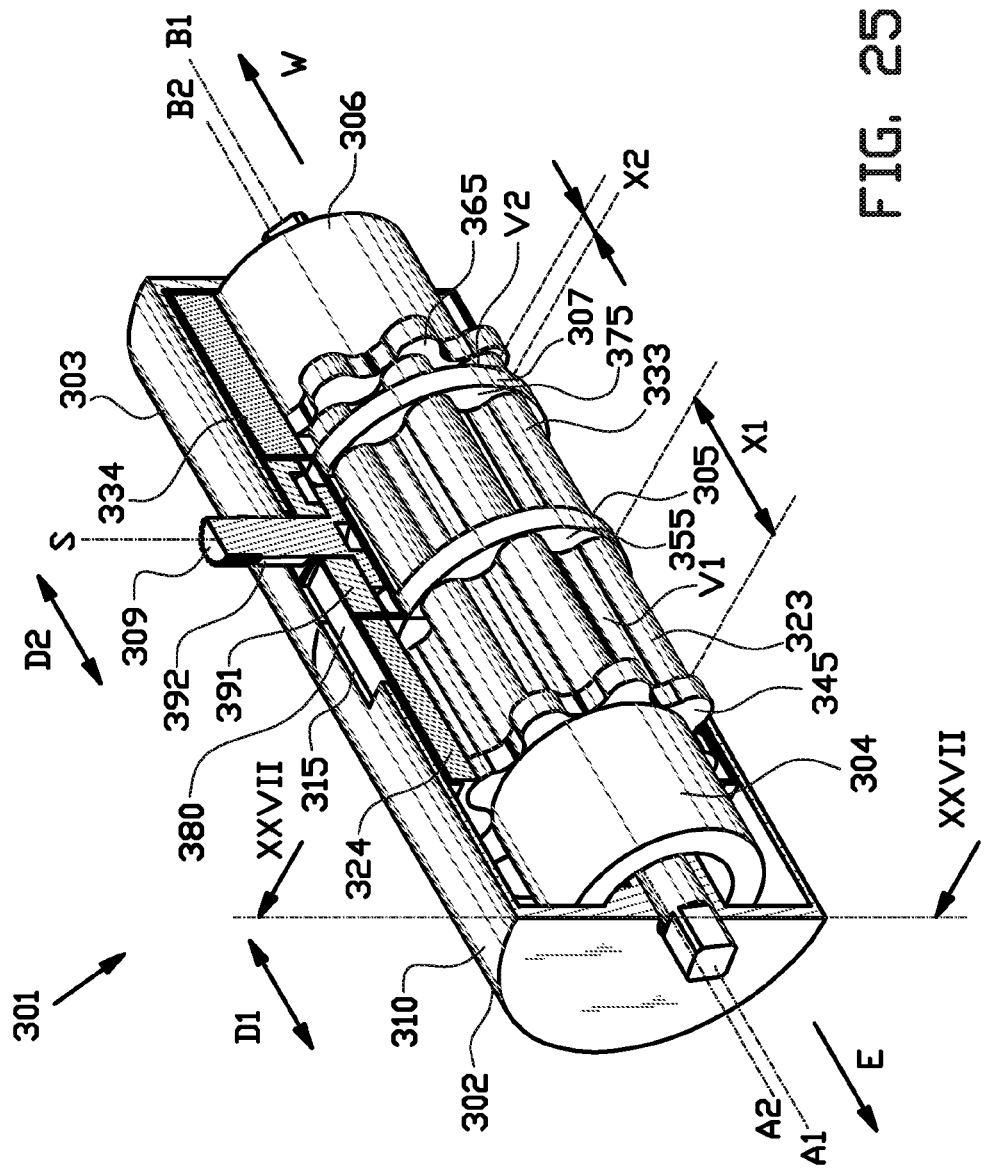
FIG. 25 shows a partial cross section of the further alternative continuously variable transmission according to line XXV-XXV in FIG. 23, with the further alternative continuously variable transmission in a first transmission position.
Figure 26:
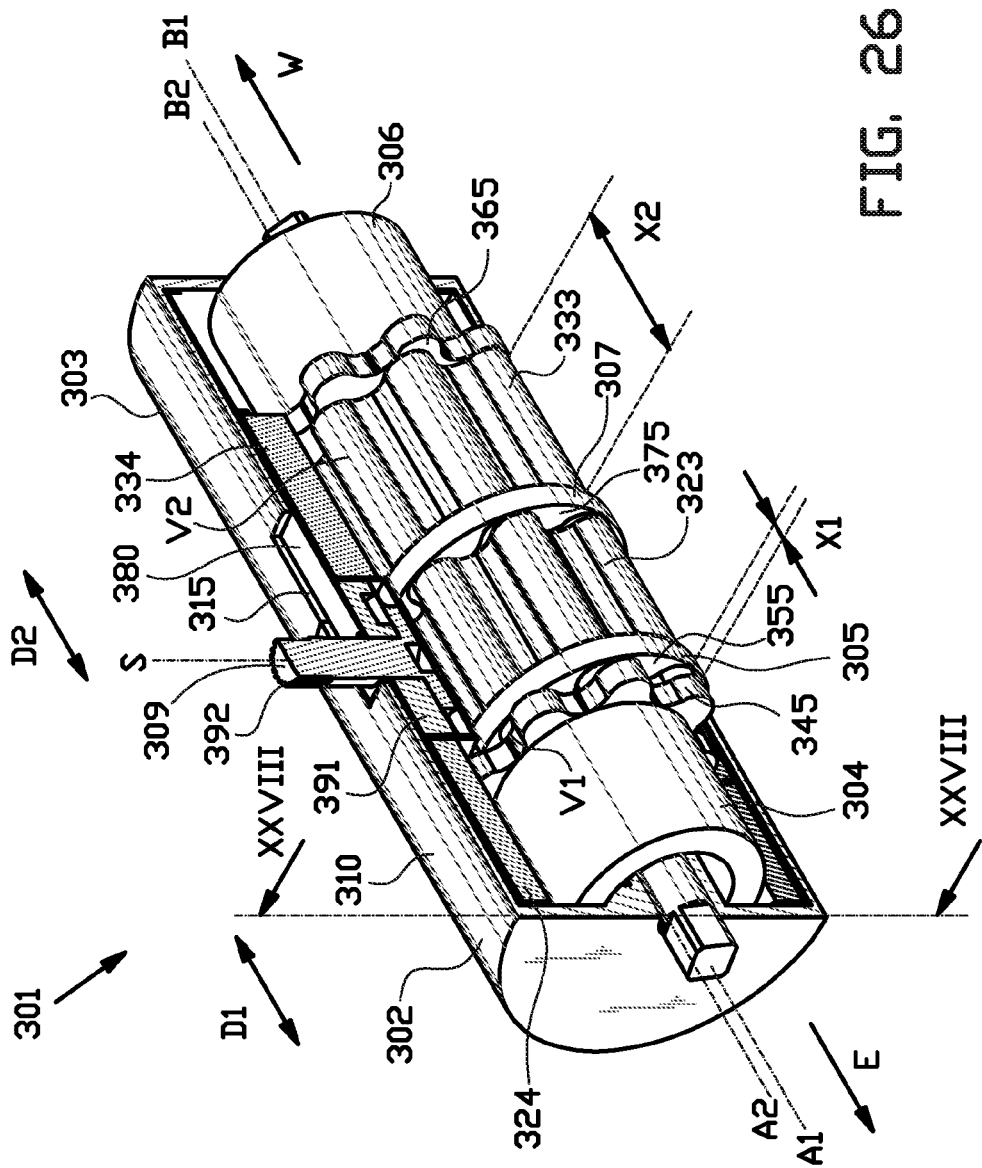
FIG. 26 shows the partial cross section of the further alternative continuously variable transmission according to FIG. 25, with the further continuously variable alternative transmission in a second transmission position.
Figure 27:
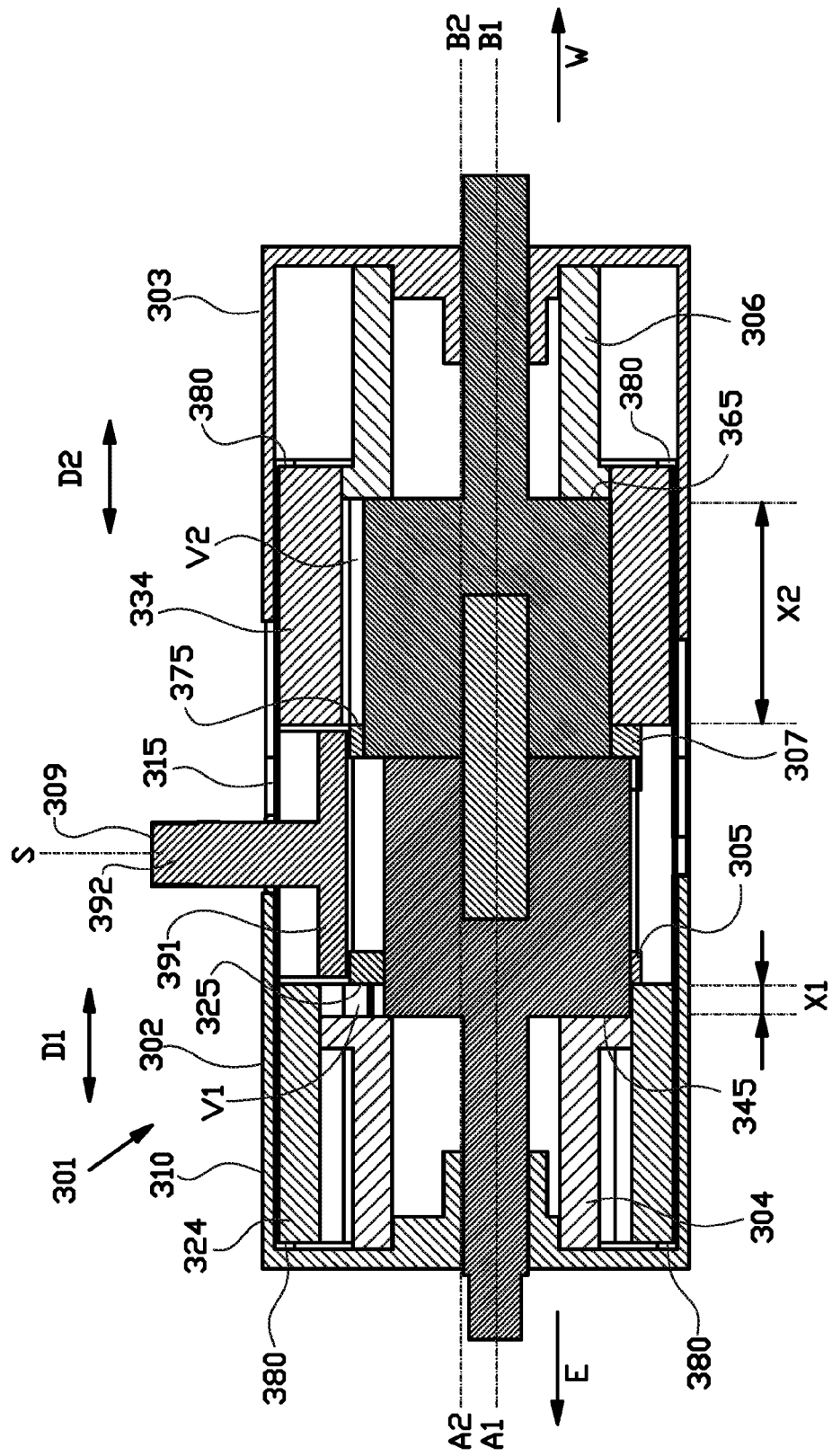
FIGS. 27 and 28 show cross sections of the further alternative continuously variable transmission according to line XXVII-XXVII in FIG. 25 and line XXVIII-XXVIII in FIG. 26, respectively.
Figure 28:
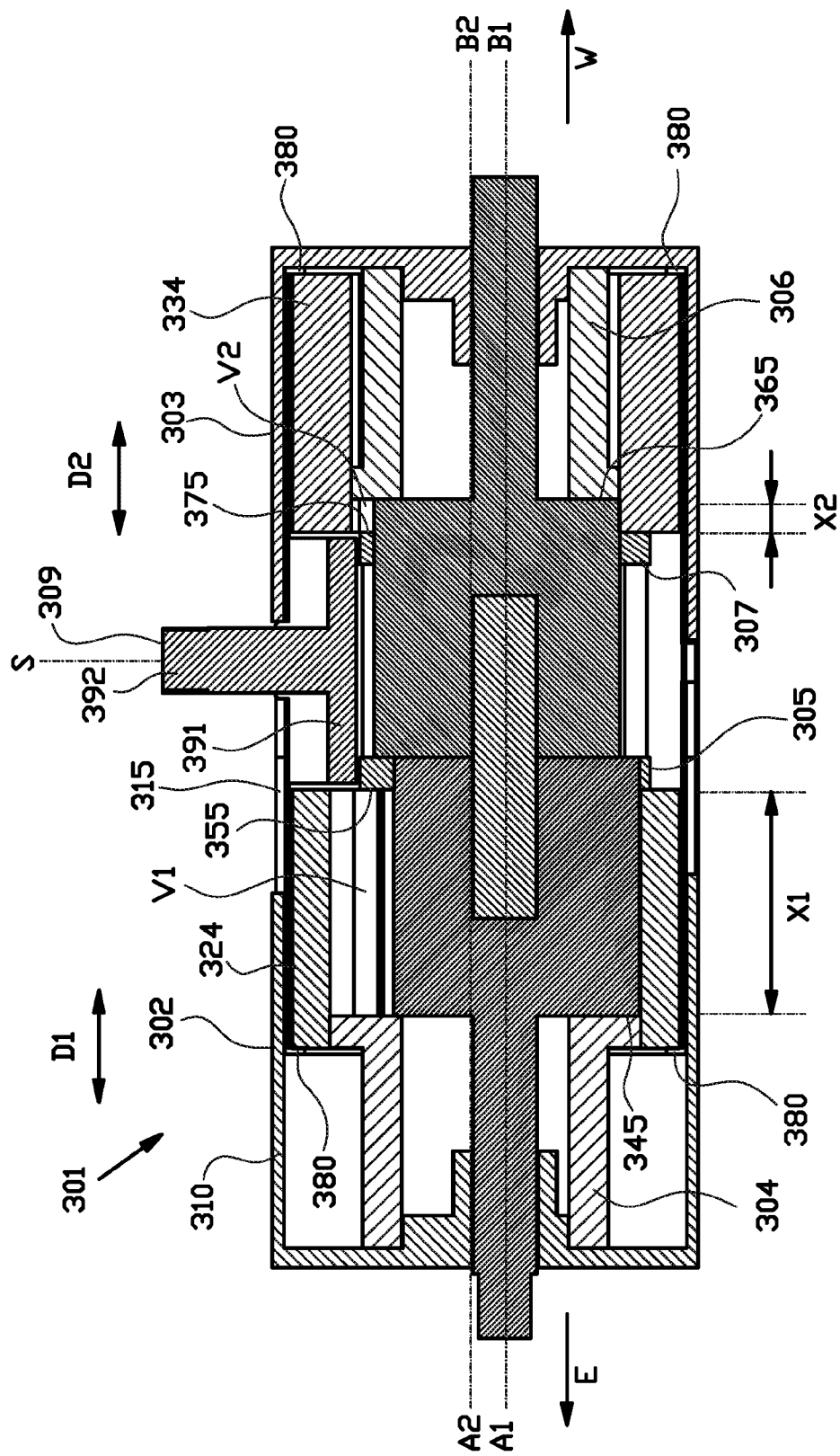
Figure 29:
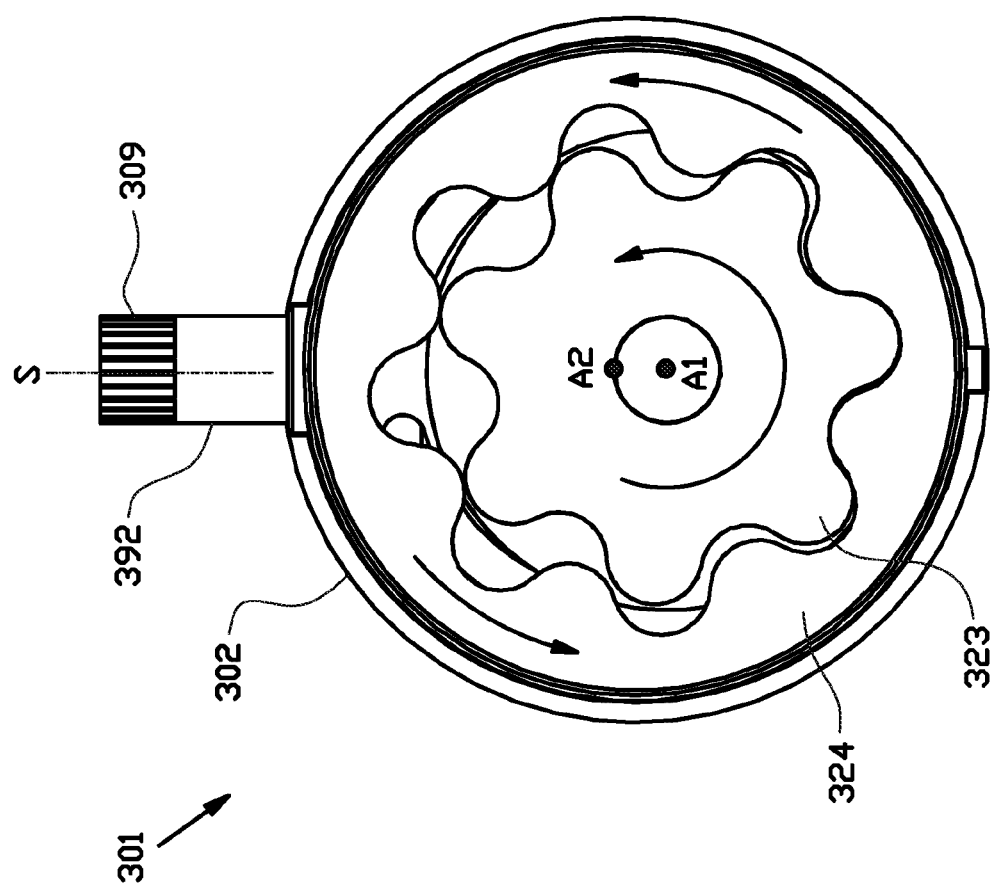
FIG. 29 shows a cross section of the further alternative continuously variable transmission according to line XXIX-XXIX in FIG. 23.

As shown in FIG. 24, the further alternative transmission 301 according to the fourth embodiment further comprises a control member 309 in the form of a knob that is coupled and/or connected to the connecting member 308 for moving said connecting member 308 and the adjustment members 305, 307 associated therewith in the respective overlap directions D1, D2. More in particular, the control member 309 is coupled to or received inside the container 380 of the connecting member 308 to directly drive the movement of the adjustment members 305, 307 in the respective overlap directions D1, D2. In this exemplary embodiment, the control member 309 comprises a base 391 that is coupled to the connecting member 308 and a knob 392 that extends from the base 391 and protrudes through a slot 315 in the housing 310. The knob 392 can be manually operated from outside the housing 310.

The further alternative transmission 301 further comprises a port member 393 for receiving said base 391. The port member 393 comprises or forms the fluid inlets 321, 331 and fluid outlets 322, 332 of the respective gear pumps 302, 303. The base 391 is rotatable with respect to said port member 391 about a switch axis S. As shown in FIGS. 30A and 30B, the control member 309 is provided with a first duct 311 and a second duct 312, a third duct 313 and a fourth duct 314 in the base 391 for connecting the fluid inlets 321, 331 and fluid outlets 322, 332 to each other. Said ducts 311-314 are integrated into the base 391, which—upon rotation of the base 391 about the switch axis S—for different rotational positions aligns different ducts 311-314 with the fluid inlets 321, 331 and fluid outlets 322, 332. In particular, the ducts 311-314 have been designed to allow for connection of the fluid outlet 322 of the first gear pump 302 to the fluid inlet 331 of the second gear pump 303 and for connection of the fluid outlet 332 of the second gear pump 303 to the fluid inlet 321 of the first gear pump 302 in a first state (FIG. 30A) and for connection of the fluid outlet 322 of the first gear pump 302 to the fluid outlet 332 of the second gear pump 303 and for connection of the fluid inlet 331 of the second gear pump 303 to the fluid inlet 321 of the first gear pump 302 in a second state (FIG. 30B). Hence, the base 391 of the control member 309 can be regarded as a switch element for switching between said states. In the second state, the direction of rotation of one of the gear pumps 302, 303 is reversed with respect to the other of the two gear pumps 302, 303. Hence, the switch element allows for the further alternative transmission 301 to be put into reverse.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In particular, it will be apparent to one skilled in the art that the gear pumps of the previously described embodiment do not necessarily need to be placed in a single housing. When the gear pumps are arranged in separate housings, the connecting member can connect the adjustment members in said separate housings mechanically, hydraulically or even electronically, e.g. with the use of controlled servo motors. Consequently, the overlap directions D1, D2 do not necessarily need to be parallel. The connecting member may provide for a change in direction between the overlap direction D1 of the first gear pump and the overlap direction D2 of the second gear pump.

More in particular, it will be apparent to one skilled in the art that generic features of one embodiment can be applied to the other embodiments as well. Each of the embodiments can for example be controlled mechanically or hydraulically, depending on the requirements of the continuously variable transmission. Moreover, the gear pumps in each of the embodiments can be housed in the same or a single housing, or in separate housings interconnected by the connecting member. Finally, it will be apparent that the switching capability introduced by the control member of the fourth embodiment can be applied just as well to the other embodiments when one provides the required additional ducts and one or more switching elements for switching between the previously disclosed ducts and said additional ducts.

The invention claimed is:

1. A continuously variable transmission comprising:
a first gear pump, and a second gear pump,
wherein each gear pump comprises a fluid inlet, a fluid outlet and a pump volume between the fluid inlet and the fluid outlet,
wherein each gear pump further comprises a first gear rotatable within the respective pump volume about a first gear axis and a second gear rotatable within the respective pump volume about a second gear axis and meshing with the first gear over an overlap distance in an overlap direction parallel to the first gear axis for displacing fluid through the respective pump volume from the respective fluid inlet to the respective fluid outlet,
wherein the fluid outlet of the first gear pump is arranged in fluid communication with the fluid inlet of the second gear pump and the fluid outlet of the second gear pump is arranged in fluid communication with the fluid inlet of the first gear pump,
wherein each gear pump further comprises an adjustment member for adjusting the pump volume of the respective gear pump,
wherein the adjustment member of the first gear pump and the adjustment member of the second gear pump are interconnected by a connecting member that is arranged for adjusting the pump volume of the first gear pump and the pump volume of the second gear pump in an inverse correlation to each other.

2. The continuously variable transmission according to claim 1, wherein the inverse correlation is an inverse proportionality.

3. The continuously variable transmission according to claim 2, wherein the inverse proportionality is such that the ratio between an increase of one of the first pump volume and the second pump volume and a decrease of the other of the first pump volume and the second pump volume is 1:1.

4. The continuously variable transmission according to claim 1, wherein the connecting member mechanically interconnects the adjustment member of the first gear pump and the adjustment member of the second gear pump.

5. The continuously variable transmission according to claim 1, wherein the connecting member is arranged for hydraulically interconnecting the adjustment member of the first gear pump and the adjustment member of the second gear pump with the use of a hydraulic circuit separate from the pump volume of the first gear pump and the pump volume of the second gear pump.

6. The continuously variable transmission according to claim 1, wherein each adjustment member is arranged for providing a relative movement between the first gear and the second gear of the respective gear pump in the respective overlap direction.

7. The continuously variable transmission according to claim 1, wherein each adjustment member is arranged for holding one of the first gear and the second gear of the respective gear pump and is movable in the respective overlap direction in unison with said one of the first gear and the second gear.

8. The continuously variable transmission according to claim 1, wherein each gear pump further comprises a holding member opposite to the adjustment member of the respective gear pump in the respective overlap direction for holding one of the first gear and the second gear of the respective gear pump,
wherein the holding member and the adjustment member comprise a first sealing surface and a second sealing surface, respectively, for sealing the pump volume of the respective gear pump in the respective overlap direction between the holding member and the adjustment member of the respective gear pump,
wherein the second sealing surface is movable in the respective overlap direction towards and away from the first sealing surface.

9. The continuously variable transmission according to claim 1, wherein each gear comprises a first gear part with a plurality of first gear teeth distributed circumferentially about the respective gear axis and a second gear part with a plurality of second gear teeth distributed circumferentially about the same gear axis,
wherein the first gear teeth and the second gear teeth are slidable along each other in the respective overlap direction for telescopically extending or contracting the respective gear in the respective overlap direction.

10. The continuously variable transmission according to claim 1, wherein the first gear pump and the second gear pump are external gear pumps.

11. The continuously variable transmission according to claim 1, wherein one of the first gear and the second gear is an internal gear and the other of the first gear and the second gear is an external gear with less teeth than and meshing with the internal gear,
wherein the first gear pump and the second gear pump are internal gear pumps.

12. The continuously variable transmission according to claim 1, wherein one of the first gear and the second gear is an internal gear and the other of the first gear and the second gear is an external gear with less teeth than and meshing with the internal gear,
wherein the first gear pump and the second gear pump are gerotor gear pumps.

13. The continuously variable transmission according to claim 1, wherein the continuously variable transmission further comprises a control member for controlling the adjustment members of the respective gear pumps.

14. The continuously variable transmission according to claim 13, wherein the control member is a lever that is operationally coupled to the adjustment member of the first gear pump, the adjustment member of the second gear pump or the connecting member.

15. The continuously variable transmission according to claim 13, wherein each gear pump comprises one or more chambers separated from the pump volume of the respective gear pump,
wherein each chamber has a chamber volume that is arranged to absorb the expansion of the pump volume of the respective gear pump,
wherein the control member comprises an hydraulic circuit interconnecting at least two of the chambers and a drive pump for pumping hydraulic fluid from one of said two chambers to the other of said two chambers.

16. The continuously variable transmission according to claim 1, wherein one of the first gear axis and the second gear axis of the first gear pump is coaxial with one of the first gear axis and the second gear axis of the second gear pump.

17. The continuously variable transmission according to claim 1, wherein the first gear axis of the first gear pump is out of line with the first gear axis of the second gear pump or wherein the second gear axis of the first gear pump is out of line with the second gear axis of the second gear pump.

18. A transmission system comprising the continuously variable transmission according to claim 1, wherein the transmission system comprises a source of energy and one or more parts to be driven by said source of energy, wherein the continuously variable transmission is arranged between the source of energy and the one or more parts to be driven.

19. The transmission system according to claim 18, wherein the continuously variable transmission is arranged in-line or in series with the source of energy and the one or more parts to be driven.

20. A continuously variable transmission comprising:
a first gear pump, and a second gear pump,
wherein each gear pump comprises a fluid inlet, a fluid outlet and a pump volume between the fluid inlet and the fluid outlet,
wherein each gear pump further comprises a first gear rotatable within the respective pump volume about a first gear axis and a second gear rotatable within the respective pump volume about a second gear axis and meshing with the first gear over an overlap distance in an overlap direction parallel to the first gear axis for displacing fluid through the respective pump volume from the respective fluid inlet to the respective fluid outlet,
wherein each gear pump further comprises an adjustment member for adjusting the pump volume of the respective gear pump,
wherein the adjustment member of the first gear pump and the adjustment member of the second gear pump are interconnected by a connecting member that is arranged for adjusting the pump volume of the first gear pump and the pump volume of the second gear pump in an inverse correlation to each other, wherein the continuously variable transmission further comprises a control member for controlling the adjustment members of the respective gear pumps, and
wherein the control member comprises a switch element for switching between a first state in which the fluid outlet of the first gear pump is arranged in fluid communication with the fluid inlet of the second gear pump and the fluid outlet of the second gear pump is arranged in fluid communication with the fluid inlet of the first gear pump and a second state in which the fluid outlet of the first gear pump is arranged in fluid communication with the fluid outlet of the second gear pump and the fluid inlet of the second gear pump is arranged in fluid communication with the fluid inlet of the first gear pump.

* * * * *